United States Patent
Dong et al.

(10) Patent No.: US 10,321,130 B2
(45) Date of Patent: Jun. 11, 2019

(54) ENHANCED DEBLOCKING FILTERS FOR VIDEO CODING

(71) Applicant: Vid Scale, Inc., Wilmington, DE (US)

(72) Inventors: Jie Dong, San Diego, CA (US); Yan Ye, San Diego, CA (US); Xiaoyu Xiu, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 387 days.

(21) Appl. No.: 14/759,606

(22) PCT Filed: Jan. 7, 2014

(86) PCT No.: PCT/US2014/010452
§ 371 (c)(1),
(2) Date: Jul. 7, 2015

(87) PCT Pub. No.: WO2014/107709
PCT Pub. Date: Jul. 10, 2014

(65) Prior Publication Data
US 2015/0365666 A1 Dec. 17, 2015

Related U.S. Application Data

(60) Provisional application No. 61/749,640, filed on Jan. 7, 2013.

(51) Int. Cl.
*H04N 19/159* (2014.01)
*H04N 19/117* (2014.01)
(Continued)

(52) U.S. Cl.
CPC ......... *H04N 19/117* (2014.11); *H04N 19/159* (2014.11); *H04N 19/33* (2014.11); *H04N 19/82* (2014.11); *H04N 19/86* (2014.11)

(58) Field of Classification Search
CPC ...... H04N 19/117; H04N 19/86; H04N 19/33; H04N 19/82
See application file for complete search history.

(56) References Cited

U.S. PATENT DOCUMENTS

| | | | |
|---|---|---|---|
| 2006/0126962 A1* | 6/2006 | Sun | H04N 19/139 382/268 |
| 2006/0146941 A1* | 7/2006 | Cha | H04N 19/61 375/240.29 |

(Continued)

FOREIGN PATENT DOCUMENTS

WO WO 2012/096614 A2 7/2012

OTHER PUBLICATIONS

Bross et al., "High Efficiency Video Coding (HEVC) Text Specification Draft 9", JCTVC-K1003, 11th Meeting: Shanghai, CN, Oct. 10-19, 2012.

(Continued)

*Primary Examiner* — Dave Czekaj
*Assistant Examiner* — Berteau Joisil
(74) *Attorney, Agent, or Firm* — Condo Roccia Koptiw LLP

(57) ABSTRACT

Deblocking filters used in video coding systems (e.g., single layer video coding systems or multi-layer video coding systems) may be enhanced. Inter layer prediction for scalable video coding (SVC) may be implemented using enhanced deblocking filters. Enhanced deblocking filters may be configured to be adapted, for example by adjusting a deblocking filter boundary strength calculation process. A deblocking filter boundary strength parameter may be assigned in accordance with, for example, a video block partition size of an input video block or a neighboring video block, whether an input video block or a neighboring video block was predicted using an inter layer reference, and/or whether at least one of an input video block or a neighboring (Continued)

video block have one or more corresponding base layer blocks that were coded using intra mode.

20 Claims, 20 Drawing Sheets

(51) Int. Cl.
*H04N 19/82* (2014.01)
*H04N 19/33* (2014.01)
*H04N 19/86* (2014.01)

(56) References Cited

U.S. PATENT DOCUMENTS

| | | | |
|---|---|---|---|
| 2009/0147848 A1* | 6/2009 | Park | H04N 19/103 375/240.13 |
| 2013/0101031 A1* | 4/2013 | Van der Auwera | H04N 19/14 375/240.12 |
| 2014/0010294 A1 | 1/2014 | Ye et al. | |

OTHER PUBLICATIONS

Dong et al., "Description of Scalable Video Coding Technology Proposal by InterDigital Communications", InterDigital Communications, LLC, JCTVC-K0034, 11th Meeting: Shanghai, CN, Oct. 10-19, 2012, 30 pages.

ISO/IEC, "Information Technology—Generic Coding of Moving Pictures and Associated Audio Information: Video", ISO/IEC 13818-2, Dec. 2000.

ISO/IEC, "Joint Call for Proposals on Scalable Video Coding Extensions of High Efficiency Video Coding (HEVC)", ISO/IEC JTC1/SC29/WG11 N12957, Stockholm, Sweden, Jul. 2012, 11 pages.

ITU-T, "Advanced Video Coding for Generic Audiovisual Services", ITU-T Recommendation H.264, Nov. 2007, 564 pages.

Luthra et al., "Draft Use Cases for the Scalable Enhancement of HEVC (v1)", ISO/IEC JTC1/SC29/WG11 M22558, Geneva, Switzerland, Nov. 2011, 8 pages.

Luthra et al., "Requirements of the scalable enhancement of HEVC", WG11 Requirements and Video, ISO/IEC JTC1/SC29/WG11, N12956, Stockholm, Sweden, Jul. 2012, 12 pages.

Ohm, Jens-Rainer, "Advances in Scalable Video Coding", Proceedings of IEEE, vol. 93, No. 1, Jan. 2005, 15 pages.

Schwarz et al., "Overview of the Scalable Video Coding Extension of the H.264/AVC Standard", IEEE Transactions on Circuits and Systems for Video Technology, vol. 17, No. 9, Sep. 2007, pp. 1103-1120.

Shi et al., "CE12, Subset 1: Report of Deblocking for Large Size Blocks", JCTVC-E144, University of Science and Technology of China, Microsoft, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 5 pages.

Shin et al., "Variable Block-Based Deblocking Filter for H.264/AVC on Low-End and Low-Bit Rates Terminals", Signal Processing: Image Communication, vol. 25, Issue 4, Apr. 2010, pp. 255-267.

Sullivan et al., "Meeting Report of the 11th Meeting of the Joint Collaborative Team on Video Coding (JCT-VC)", 11th Meeting: Shanghai, CN, Oct. 10-19, 2012, 66 pages.

Tech et al., "MV-HEVC Draft Text 2", JCT3V-B1004, 2nd Meeting: Shanghai, CN, Oct. 13-19, 2012, 22 pages.

Bici et al., "AHGIO: Hook for Scalable Extensions: Signalling TMVP Reference Index in Slice Header", Nokia Corporation, JCTVC-10224, 10th Meeting: Stockholm, SE, Jul. 11-20, 2012, 4 pages.

De Cock et al., "Architectures for Fast Transcoding of H.264/AVC to Quality-Scalable SVC Streams", IEEE Transactions on Multimedia, vol. 11, No. 7, Nov. 2009, 16 pages.

Kim et al., "Description of Scalable Video Coding Technology Proposal by LG Electronics and MediaTek (Differential Coding Mode on)", JCTVC-K0033, 11th Meeting: Shanghai, CN, Oct. 10-19, 2012, 38 pages.

Norkin et al., "HEVC Deblocking Filter", IEEE Transactions on Circuits and Systems for Video Technology, vol. 22, No. 12, 9 pages.

Ye et al., "Modified Deblocking Filter for the ref_idx Framework", InterDigital Communications, LLC, JCTVC-L0050, 12th Meeting: Geneva, CH, Jan. 14-23, 2013, 4 pages.

\* cited by examiner

| | Descriptor |
|---|---|
| seq_parameter_set_rbsp( ) { | |
|   video_parameter_set_id | u(4) |
|   sps_max_sub_layers_minus1 | u(3) |
|   sps_temporal_id_nesting_flag | u(1) |
|   sps_reserved_zero_bit | u(1) |
|   profile_tier_level( 1, sps_max_sub_layers_minus1 ) | |
|   seq_parameter_set_id | ue(v) |
|   video_parameter_set_id | u(4) |
|   ... | |
|   if( nuh_layer_id > 0 ) | |
|   { | |
|     sps_inter_layer_deblocking_enabled_flag | u(1) |
|   } | |
|   ... | |

FIG. 14

| | Descriptor |
|---|---|
| slice_segment_header( ) { | |
| first_slice_segment_in_pic_flag | u(1) |
| if( RapPicFlag ) | |
| no_output_of_prior_pics_flag | u(1) |
| ... | |
| if( slice_segment_header_extension_present_flag ) { | |
| if( nuh_layer_id > 0 ) | |
| slice_inter_layer_deblocking_enabled_flag | u(1) |
| ~} | |
| ... | |
| ~} | |

FIG. 15

ENHANCED DEBLOCKING FILTERS FOR VIDEO CODING

CROSS-REFERENCE TO RELATED APPLICATIONS

This application claims priority to U.S. provisional patent application No. 61/749,640, filed Jan. 7, 2013, which is incorporated herein by reference in its entirety.

BACKGROUND

In recent years demand for wirelessly transmitted video, for example digital video transmitted to and/or received from applications executed on mobile devices, has steadily increased. Digital video signals may be processed so as to reduce storage space consumed and/or to reduce transmission bandwidth consumption associated with such signals. For example, a video coding system, such as a scalable video coding (SVC) system, may be configured to compress, filter, or otherwise process digital video signals. Such processing may improve the video quality of digital video services and/or the user experiences associated with such services.

In an example of video signal processing, a video coding system may apply one or more deblocking filters to video signals, which may reduce blocking artifacts. However, known deblocking filters typically exhibit a limited ability to smooth out discontinuities along block edges. Discontinuity remaining after deblocking may reduce the effectiveness of inter layer prediction, which may detrimentally affect coding efficiency in a video coding system.

Respective partition characteristics (e.g., partition sizes) of one or more video blocks of a video bitstream may be related to an amount of blocking artifacts (e.g., along the block edges of one or more neighboring video blocks). Such blocking artifacts may reduce the effectiveness of temporal prediction and/or interlayer prediction of video processing, which may decrease coding efficiency and/or diminish visual quality. Known deblocking filters may not account for video block partition size in designing deblocking filters.

SUMMARY

The design of deblocking filters in a video coding system may be enhanced to reduce the presence of blocking artifacts, for example along edges of neighboring video blocks. Enhanced deblocking filters may be implemented in single layer video coding systems and/or in multi-layer video coding systems. For example, adaptable deblocking filters may be implemented in inter layer prediction for a scalable video coding (SVC) system. Deblocking filters may be adapted, for example, by adjusting a deblocking filter boundary strength calculation process for scalable video coding.

A video coding process may include identifying a first video block of a video bitstream. The video coding process may include determining a first partition size of the first video block. The video coding process may include identifying a second video block of the video bitstream. The second video block may neighbor the first video block. The video coding process may include adapting a deblocking filter in accordance with the first partition size. The video coding process may include determining a second partition size of the second video block. The video coding process may include adapting the deblocking filter in accordance with at least one of the first partition size or the second partition size. Adapting the deblocking filter may include assigning a value to a boundary strength parameter of the deblocking filter. The video coding process may include applying the deblocking filter to a portion of the video bitstream. The portion of the video bitstream may include at least one of the first or second video blocks.

A video coding device may include a processor that is configured to identify a first video block of a video bitstream. The processor may be configured to determine a first partition size of the first video block. The processor may be configured to identify a second video block of the video bitstream that neighbors the first video block. The processor may be configured to adapt a deblocking filter in accordance with the first partition size. The processor may be configured to determine a second partition size of the second video block. The processor may be configured to adapt the deblocking filter in accordance with at least one of the first partition size or the second partition size. The processor may be configured to adapt the deblocking filter by assigning a value to a boundary strength parameter of the deblocking filter. The processor may be configured to apply the deblocking filter to a portion of the video bitstream. The portion of the video bitstream may include at least one of the first or second video blocks.

A video coding process may include identifying a first video block of a video bitstream. The video coding process may include identifying a second video block of the video bitstream. The second video block may neighbor the first video block. The video coding process may include making a first determination of whether at least one of the first video block or the second video block was predicted using inter layer prediction. The video coding process may include, if at least one of the first video block or the second video block was predicted using inter layer prediction, making a second determination of whether a corresponding base layer block of the first video block or the second video block was coded using intra mode. The video coding process may include adapting a deblocking filter in accordance with the first and second determinations. Adapting the deblocking filter may include assigning a value to a boundary strength parameter of the deblocking filter. The video coding process may include applying the deblocking filter to a portion of the video bitstream. The portion of the video bitstream may include at least one of the first or second video blocks.

BRIEF DESCRIPTION OF THE DRAWINGS

FIG. 14 is a table of example signaling that may indicate use of an adaptable deblocking filter at a video sequence level.

FIG. 15 is a table of example signaling that may indicate use of an adaptable deblocking filter at a picture (e.g., slice) sequence level.

DETAILED DESCRIPTION

Figure 1:
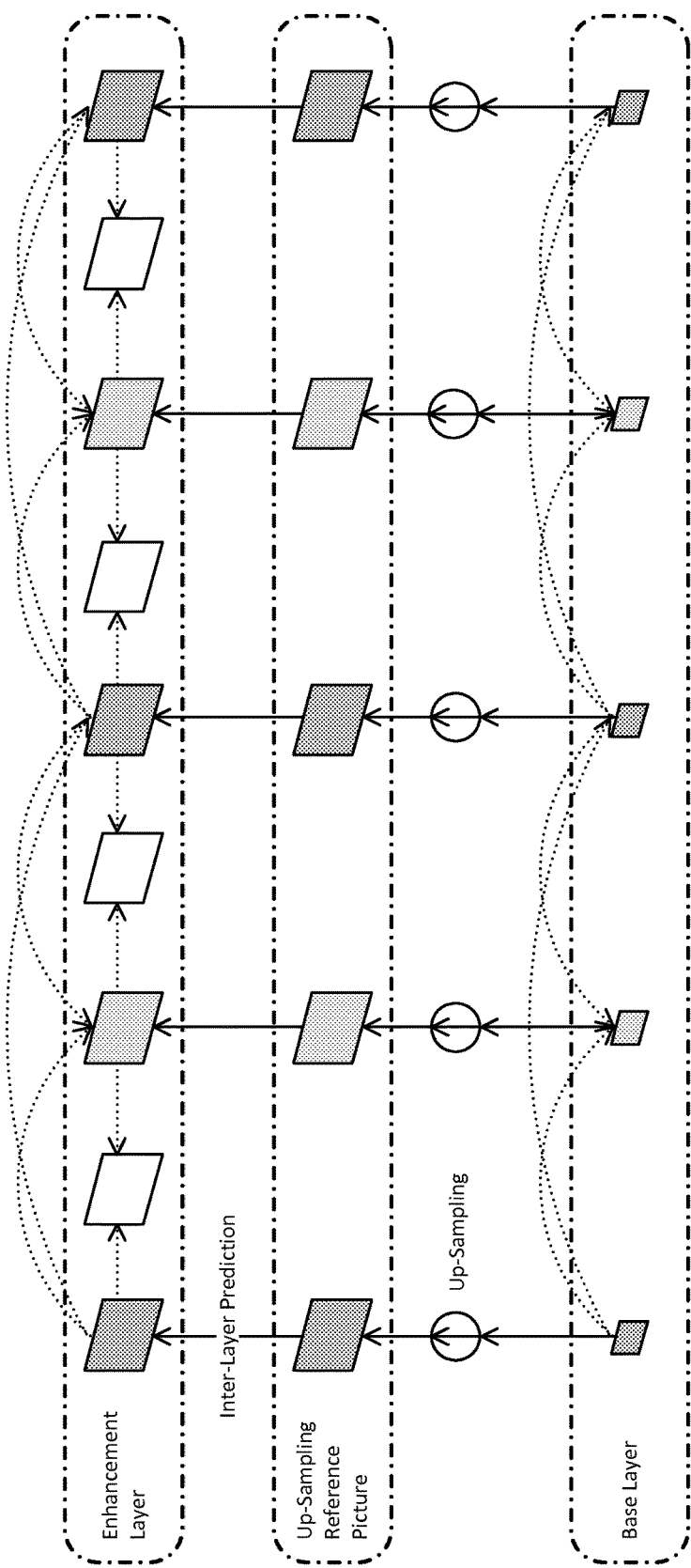
FIG. 1 depicts an example scalable video coding (SVC) inter layer prediction structure.

Video coding systems, such as single layer video coding systems and multi-layer video coding systems, may be used to encode and/or decode a video bitstream into digital video signals for efficient transmission (e.g., transmission via a cellular communications network).

A video coding system may include one or more devices that may be configured to perform video coding (e.g., to encode and/or decode video signals). Such devices may be referred to as video coding devices. Such video coding devices may include video-capable devices, for example a television, a digital media player, a DVD player, a Blu-ray™ player, a networked media player device, a desktop computer, a laptop personal computer, a tablet device, a mobile phone, a video conferencing system, a hardware and/or software based video encoding system, or the like. Such video coding devices may include wireless communications network elements, such as a wireless transmit/receive unit (WTRU), a base station, a gateway, or other network elements.

A video coding device may be configured to receive video signals (e.g., video bitstreams) via a network interface. A video coding device may have a wireless network interface, a wired network interface, or any combination thereof. For example, if the video coding device is a wireless communications network element (e.g., a wireless transmit receive unit (WTRU)), the network interface may be a transceiver of the WTRU. In another example, if the video coding device is a video-capable device that is not configured for wireless communication (e.g., a back-end rack encoder) the network interface may be a wired network connection (e.g., a fiber optic connection). In another example, the network interface may be an interface that is configured to communicate with a physical storage medium (e.g., an optical disk drive, a memory card interface, a direct connection to a video camera, or the like). It should be appreciated that the network interface is not limited to these examples, and that the network interface may include other interfaces that enable a video coding device to receive video signals. A video coding device may be configured to perform deblocking filtering on one or more video signals (e.g., a source video signal received by a network interface of the video coding device).

A scalable video coding (SVC) system may encode a digital video signal at a maximum resolution (e.g., a resolution associated with a highest quality of the digital video signal). An SVC system may enable decoding of the digital video signal from subsets of one or more video streams associated with the digital video signal. The digital video signal may be decoded into the one or more streams in accordance with, for example, one or more of a rate specified by an application (e.g., a frame rate); a resolution specified by an application, or a resolution supported by a device associated with the digital video signal (e.g., a mobile device configured to receive and/or render at least a portion of the digital video signal). The decoding of one or more partial bit streams may provide video services with lower temporal and/or spatial resolutions, and/or with reduced fidelity, while retaining a reconstruction quality that is substantially high relative to a rate of the partial bit streams. An SVC system may be implemented with tools and/or profiles to support one or more scalability modes.

In a multi-layer video coding system (e.g., an SVC system), video signals from one or more lower layers may be used to predict video in a layer (e.g., a current layer). This process may be referred to as inter layer prediction (ILP). Implementing ILP may improve scalable coding efficiency. For example, an SVC system may employ inter layer prediction techniques including one or more of inter layer texture prediction, inter layer motion vector prediction, inter layer residual signal prediction, and so on to improve coding efficiency of an enhancement layer (e.g., a current enhancement layer). Single loop decoding may be implemented, such that when an enhancement layer (e.g., a current enhancement layer) is decoded, respective reference pictures from one or more lower layers may not be fully reconstructed.

FIG. 1 depicts an example SVC inter layer prediction structure that illustrates spatial scalability. One or more base layer (BL) pictures may be upsampled, for example to substantially match an enhancement layer (EL) video spatial resolution. The one or more upsampled inter layer reference pictures may be used as reference pictures to predict the EL video.

Figure 2:
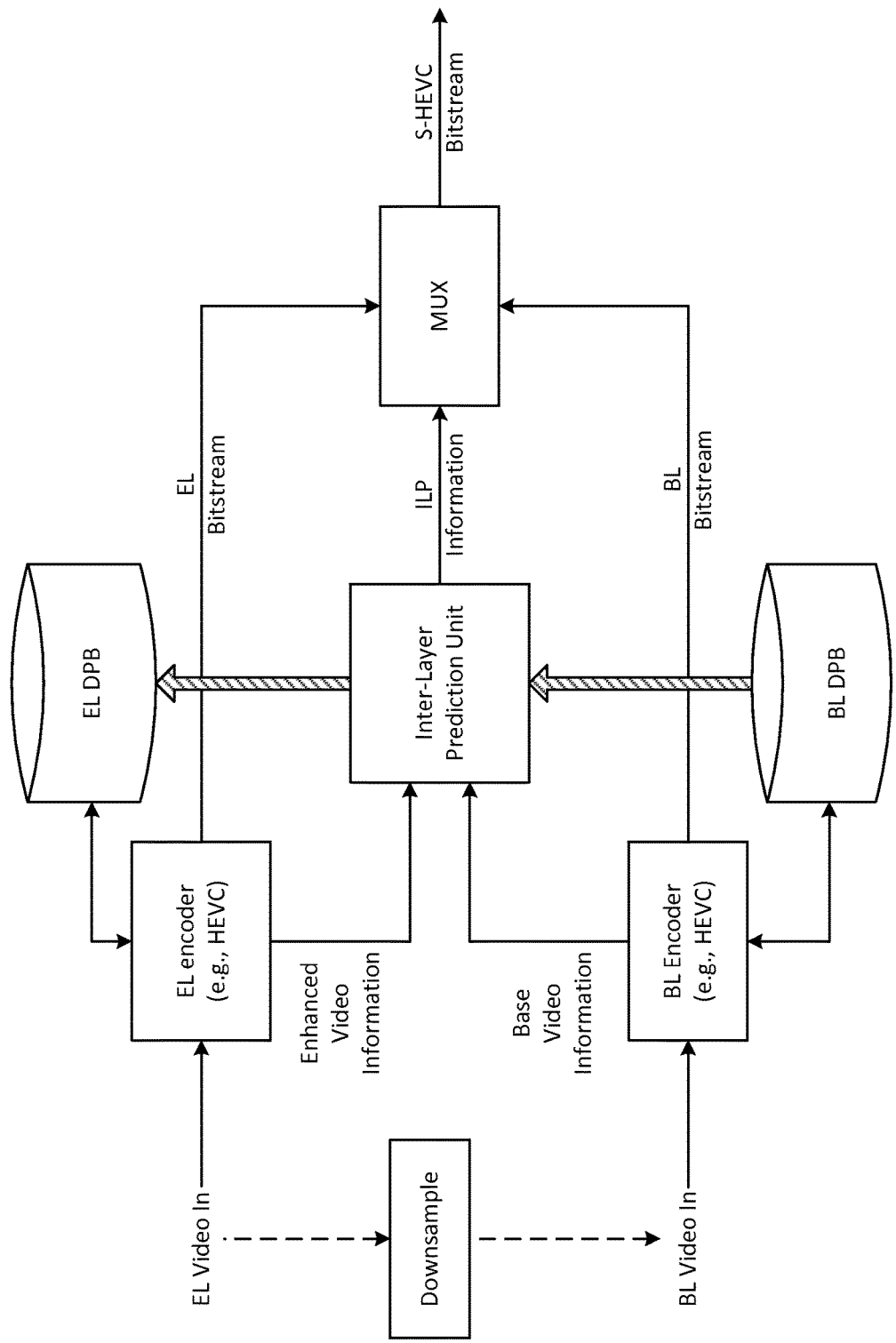
FIG. 2 depicts a block diagram of an example scalable video encoder that may use the inter layer prediction structure depicted in FIG. 1.
Figure 3:
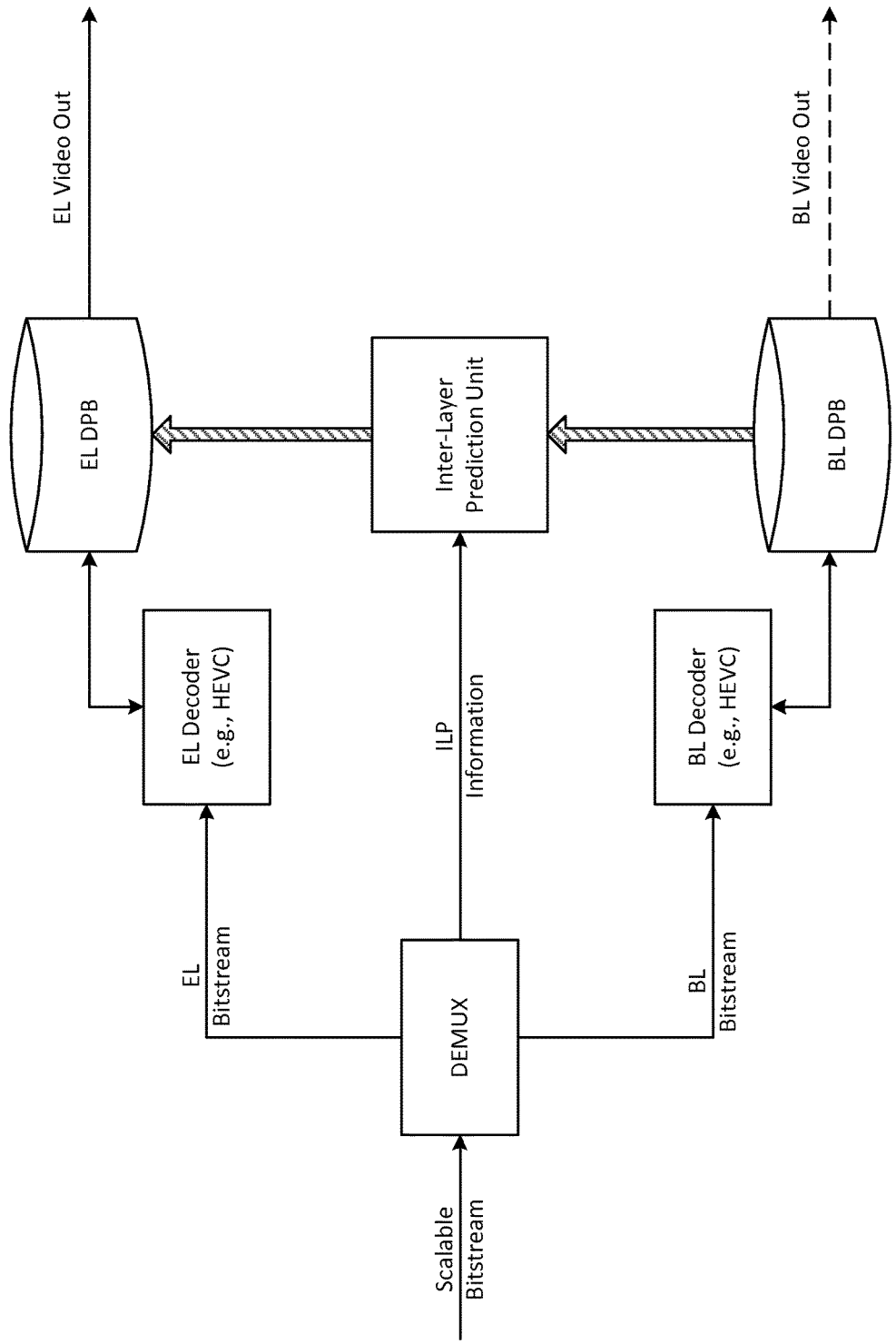
FIG. 3 depicts a block diagram of an example scalable video decoder that may use the inter layer prediction structure depicted in FIG. 1.

Block diagrams of an example SVC system, including an example scalable video encoder and an example scalable video decoder, that may implement the prediction structure depicted in FIG. 1 are depicted in FIGS. 2 and 3, respectively. The example SVC system depicted in FIGS. 2 and 3 may be configured with respective preferred operation modes that may perform one or more ILP operations, for example to picture level processing.

Figure 4:
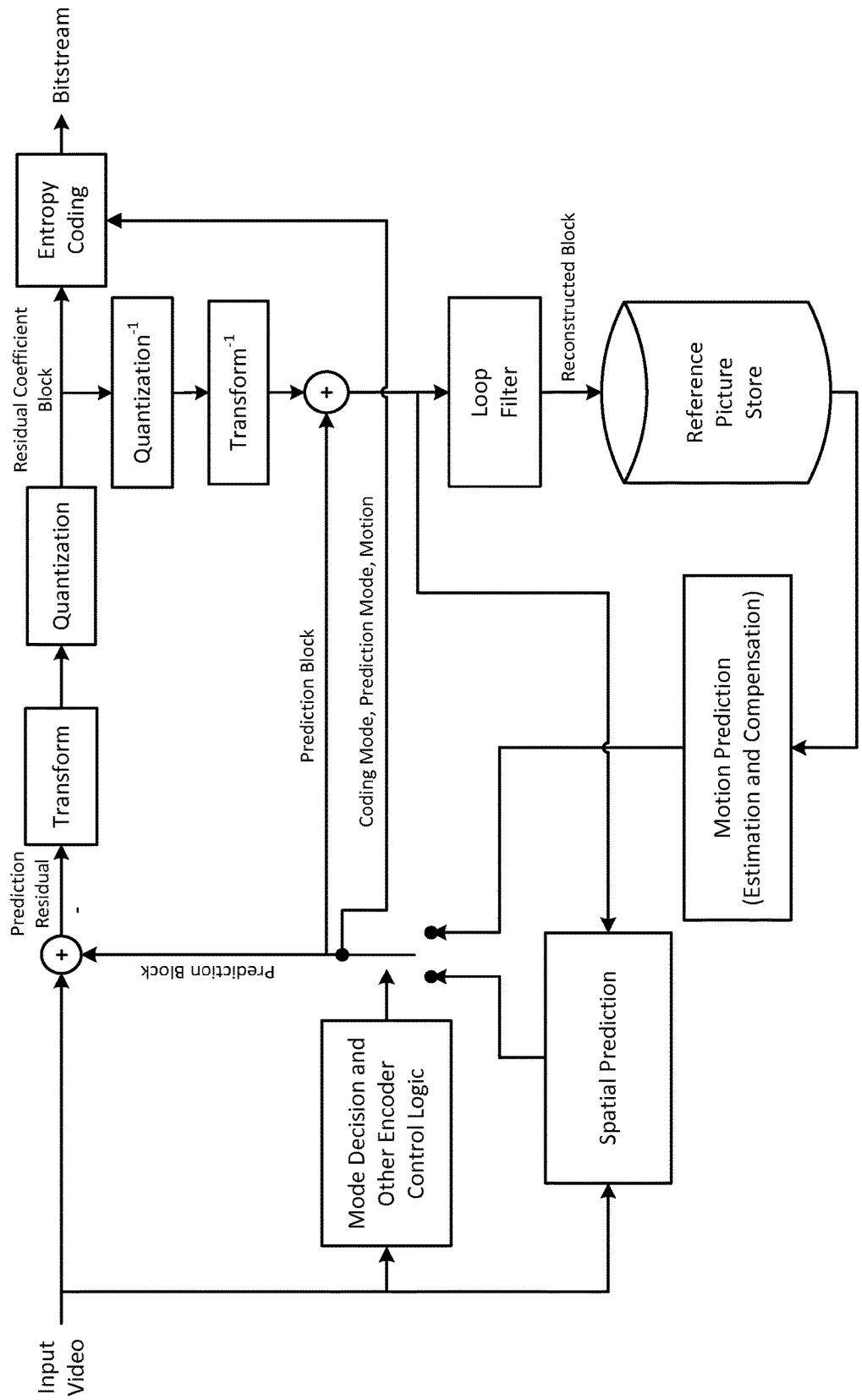
FIG. 4 depicts operation of an example hybrid video coding encoder.

The example scalable video encoder depicted in FIG. 2 may be implemented with a two-layer scalable encoding system having picture-level ILP support. The BL encoder (e.g., a high efficiency video coding (HEVC) encoder) may encode the BL video input, for example using a combination of spatial and temporal prediction. The BL encoder may produce the BL bitstream, for example in the form of one or more network abstraction layer (NAL) units. Spatial and/or temporal prediction may be supported by a block based hybrid video coding system. For example, a block diagram of an example hybrid video coding encoder that may be used to perform one or more functions of the scalable video encoder of FIG. 2 is depicted in FIG. 4. With continued reference to FIG. 2, the BL encoder may establish a base layer decoded picture buffer (BL DPB). The BL DPB may store one or more reference pictures that may be used, for example, to perform temporal motion compensated prediction.

In the enhancement layer, the EL encoder may operate in a manner that may be substantially similar to that of the BL encoder. For example, the EL encoder may establish an enhancement layer decoded picture buffer (EL DPB) that may provide one or more reference pictures for prediction of an input EL video by the EL encoder. The EL DPB may store reference pictures from an enhancement layer (e.g., a current enhancement layer) and/or may store one or more reference pictures from the DPB of a dependent layer, for example the BL DPB.

The EL encoder may produce an EL bitstream, for example in the form of one or more NAL units. One or more reference pictures from the BL DPB may be processed by an ILP unit, for example before being used to predict the EL video. The ILP unit may pack select ILP info into the bitstream, for example in the form of one or more NAL units.

Respective NAL units of the BL bitstream, the EL bitstream, and/or ILP information may be multiplexed into a scalable bitstream by a MUX unit.

Figure 5:
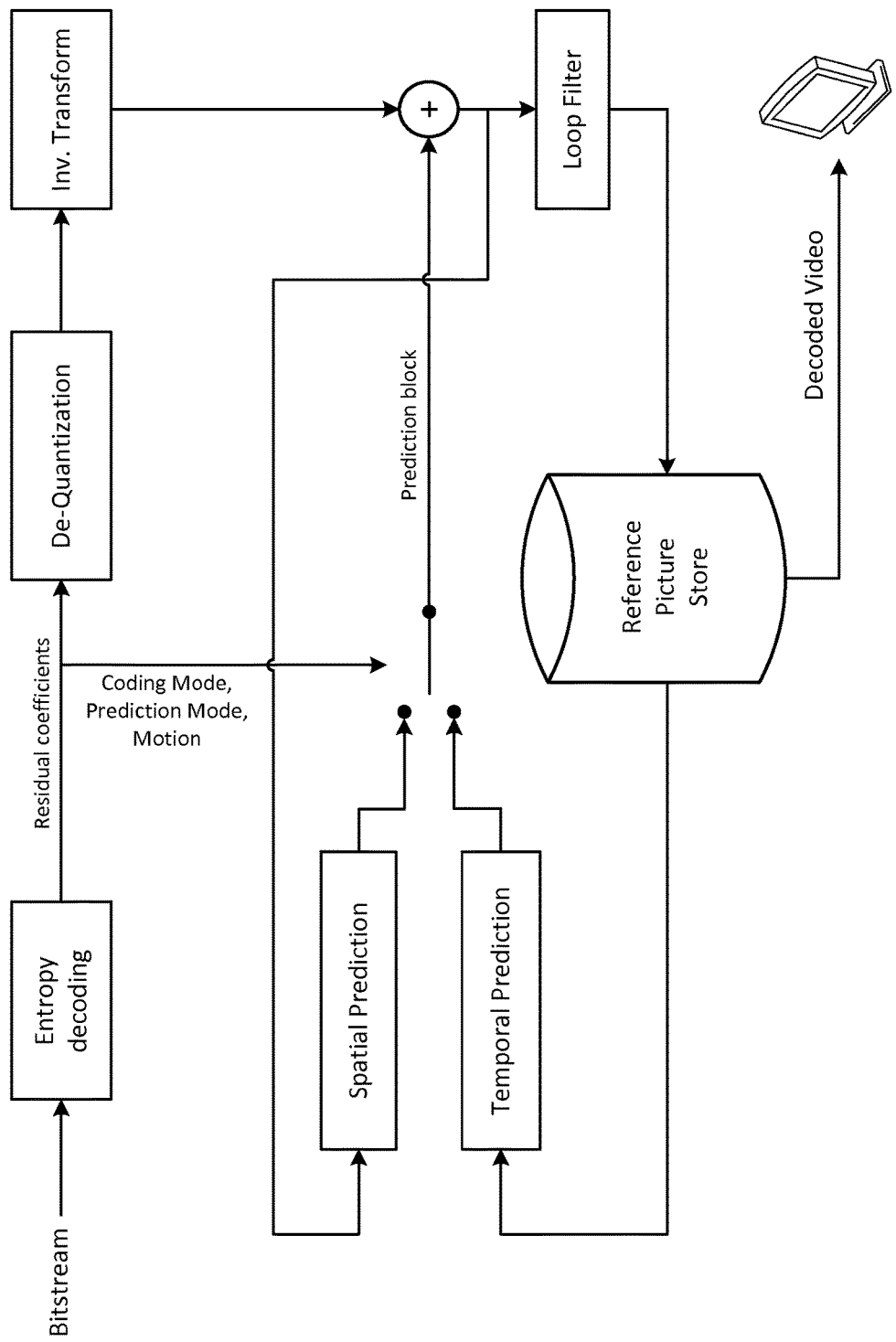
FIG. 5 depicts operation of an example hybrid video coding decoder.

The example scalable video decoder depicted in FIG. 3 may correspond to the example scalable video encoder of FIG. 2. A demultiplexer, which may be referred to as a DEMUX unit, may receive a scalable bitstream. The scalable bitstream may include one or more NAL units that may correspond to one or more of BL coded slices and/or pictures, EL coded slices and/or pictures, or ILP information. The DEMUX unit may demultiplex the scalable bitstream. The DEMUX unit may send one or more NAL units that correspond to BL coded slices and/or pictures to a BL decoder. The DEMUX unit may send one or more NAL units that correspond to EL coded slices and/or pictures to the EL decoder. The DEMUX unit may send one or more NAL units that correspond to ILP information to the ILP unit for processing and/or management. A block diagram of an example hybrid video coding decoder that may be used to perform one or more functions of the BL and/or EL decoders of the scalable video decoder of FIG. 3 is depicted in FIG. 5.

One or more filters, for example one or more loop filters, may be used to improve coding efficiency and/or the quality of reconstructed video. For example, a deblocking filter may be implemented to reduce and/or remove one or more blocking artifacts from a reconstructed video signal. A deblocking filter may be implemented in a single layer video coding system or a multi-layer video coding system (e.g., an SVC system). A deblocking filter may reduce and/or remove one or more blocking artifacts from a reconstructed video signal without filtering out one or more true edges in the original video. Such a process may improve visual quality of the reconstructed video signal.

Use of one or more deblocking filters may improve the coding efficiency of a video coding system. For example, a deblocking filter may be configured with one or more low pass filter characteristics that may smooth out discontinuity along one or more block edges that may be due, for example, to quantization. A smoother reconstructed video signal may serve as a better prediction signal, for example when used to predict a future video signal.

One or more deblocking filters may be implemented in concert with one or more other loop filters, for example a sample adaptive offset (SAO) filter. An SAO filter may improve visual quality and/or may enhance coding efficiency.

One or more deblocking filters may be configured to perform as adaptive deblocking filters. Implementing one or more adaptive deblocking filters in a video coding system may improve coding efficiency and/or visual quality. For example, implementing one or more adaptive deblocking filters in an SVC system may improve video coding efficiency and/or visual quality of the SVC system. In another example, implementing one or more adaptive deblocking filters in a single layer video coding system may improve video coding efficiency and/or visual quality of the video coding system.

Figure 6:
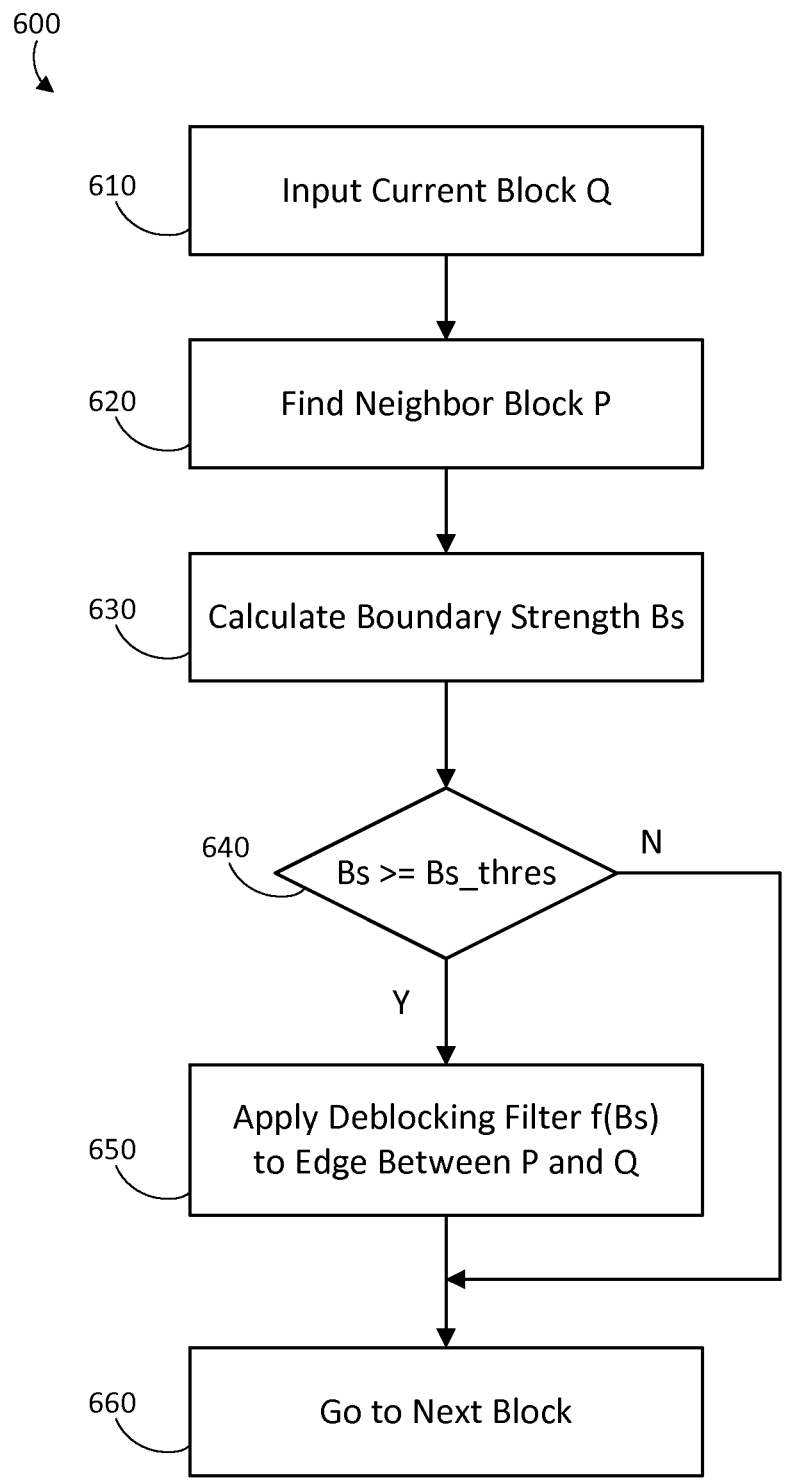
FIG. 6 depicts an example deblocking filter process flow.
Figure 7B:
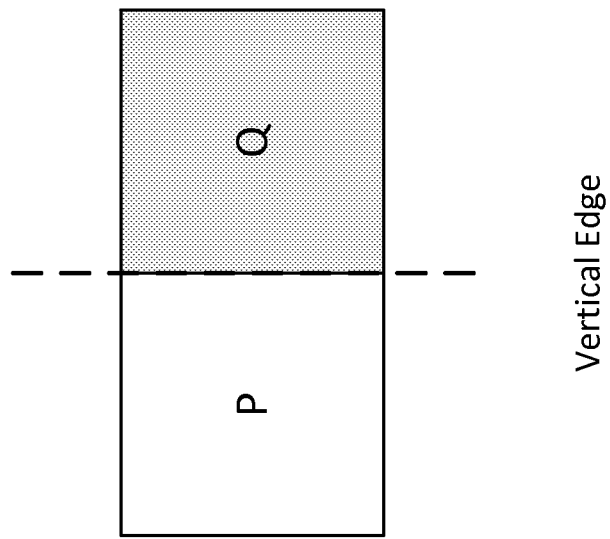
FIG. 7B depicts an example of vertical edge filtering applied to an input block and a neighboring block.
Figure 7A:
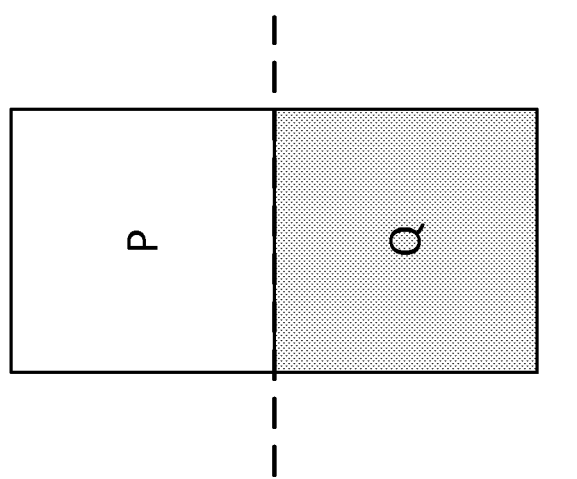
FIG. 7A depicts an example of horizontal edge filtering applied to an input block and a neighboring block.

FIG. 6 depicts an example deblocking filter process flow 600. The example deblocking filter process flow 600 may be used, for example, in H.264 advanced video coding (AVC) and/or in HEVC. At 610, an input video block Q (e.g., a current video block) may be identified. At 620, a neighboring video block P of the input video block Q may be identified. Identification of the neighboring video block P may be associated with the filtering being applied to the input video block Q. For example, as depicted in FIG. 7A, if a horizontal edge of the input video block Q is filtered, the neighboring video block P may be a top neighbor of the input video block Q. In another example, as depicted in FIG. 7B, if a vertical edge of the input video block Q is filtered, the neighboring video block P may be a left neighbor of the input video block Q.

With continued reference to FIG. 6, at 630 a boundary strength (Bs) parameter may be calculated. The boundary strength parameter may be based on one or more coding characteristics associated with the neighboring video block P and/or the input video block Q. The boundary strength parameter may be used to identify a likely severity of one or more blocking artifacts between the neighboring video block P and the input video block Q. The boundary strength parameter may be used to control the behavior of deblocking filtering f(Bs) between the neighboring video block P and the input video block Q, for example in accordance with the identified likely blocking artifact severity.

Boundary strength parameter values may be representative of the strengths of corresponding deblocking filters. For example, a low boundary strength parameter value may be associated with application of a weaker deblocking filter, and a higher boundary strength parameter value may be associated with application of a stronger deblocking filter. Boundary strength parameter values may be represented by indicators (e.g., numbers, letters, symbols, etc.) To illustrate, different boundary strength parameter values may be expressed in terms of corresponding integers (e.g., such that respective deblocking filter strengths increase as integers representative of boundary strength increase). For example, a spectrum of boundary strength parameters may include integer values from 0 to 4 (e.g., as in H.264/AVC), integer values from 0 to 2 (e.g., as in HEVC), or any other range of integer values.

At 640, the calculated Bs may be compared to a boundary strength parameter threshold (Bs_thres). If the calculated Bs is equal to or greater than Bs_thres, at 650 a deblocking filter f(Bs) may be applied, for example to an edge between the neighboring video block P and the input video block Q. At 660, the deblocking filter process flow 600 may proceed to another video block. If the calculated Bs is less than Bs_thres, a deblocking filter may not be applied between the neighboring video block P and the input video block Q (e.g., omitting 650), and the deblocking filter process flow 600 may proceed to 660. It should be appreciated that the example deblocking filter process flow 600 is not limited to the illustrated order. For example, one or more parts of the example deblocking filter process flow 600 may be carried out in a different order, or may be omitted.

The luma and chroma components of a video signal may use the same or different deblocking filters. For example, Bs_thres may be set to 0 for the luma component and may be set to 1 for one or both chroma components (e.g., as in HEVC). If Bs=0, a deblocking filter may not be applied to an edge between the neighboring video block P and the input video block Q for the luma component. If Bs=0 or Bs=1, a deblocking filter may not be applied to an edge between the neighboring video block P and the input video block Q for one or both chroma components.

Figure 8:
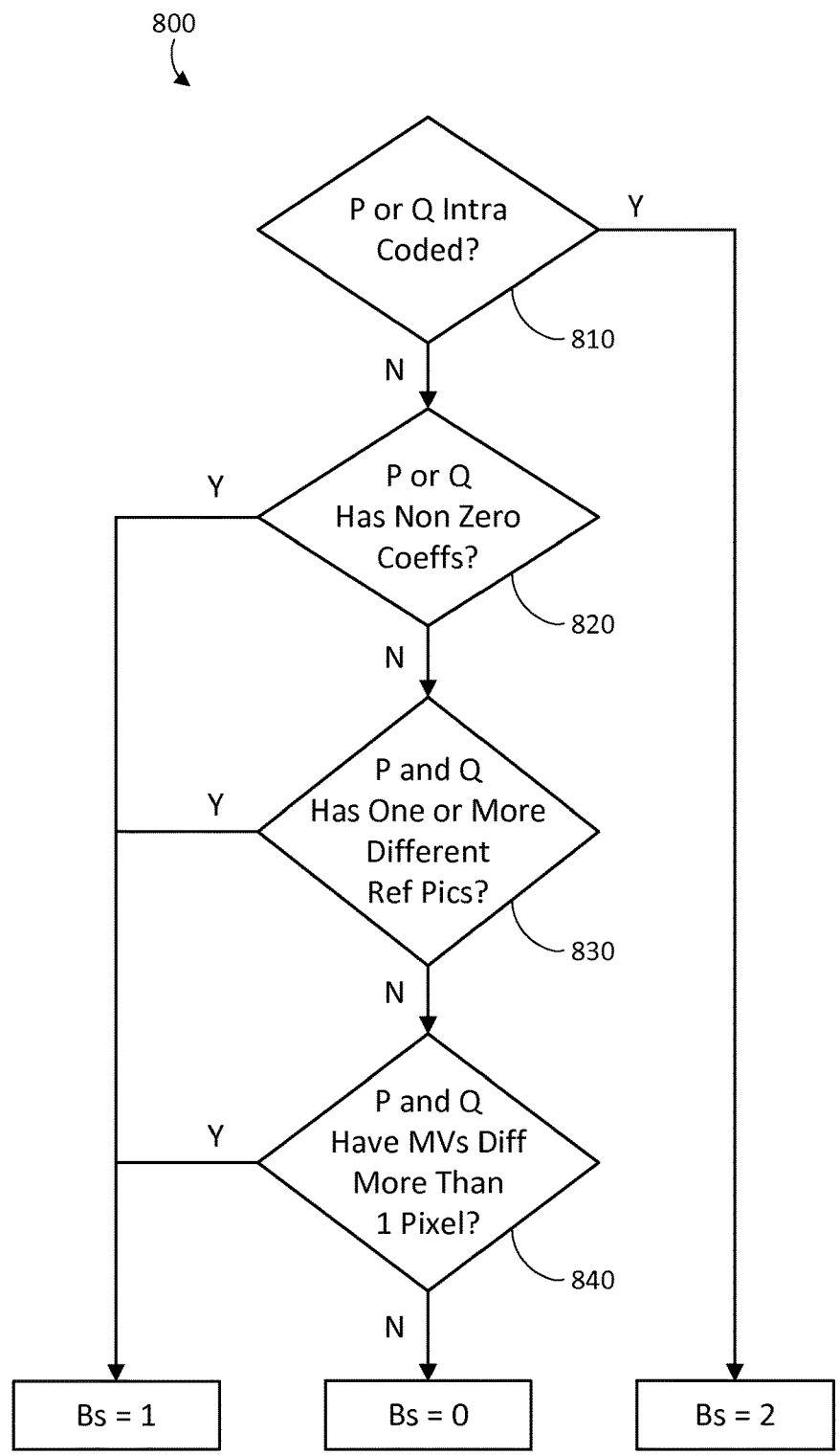
FIG. 8 depicts an example process for calculating a boundary strength parameter value for a deblocking filter.

The value of the boundary strength parameter may rely on one or more respective coding characteristics of the neighboring video block P and/or the input video block Q. FIG. 8 depicts an example deblocking filter boundary strength calculation process flow 800 (e.g., as in HEVC). As shown, deblocking filter boundary strength values of 0 to 2 may be defined.

At 810, it may be determined whether one or both of an input video block Q or a neighboring video block P was coded using intra mode. If one or both of the input video block Q and the neighboring video block P were coded using intra mode, the deblocking filter boundary strength parameter may be set to 2. When the boundary strength parameter is set to 2, a strong deblocking filter may be applied between the neighboring video block P and the input video block Q. Intra prediction may not be as accurate as inter prediction. A quantization process that may be applied to an intra prediction residual may be manifested as one or more visible blocking artifacts in a reconstructed video.

If neither of the input video block Q or the neighboring video block P were coded using intra mode, the neighboring video block P and the input video block Q may have been coded using inter mode. When both the neighboring video block P and the input video block Q are coded using inter mode, the deblocking filter boundary strength parameter may be set to 1 (e.g., when one or more of the conditions of 820, 830, or 840 are true), or may be set to 0 (e.g., when none of the conditions of 820, 830, or 840 are true).

At 820, it may be determined whether one or both of the input video block Q or the neighboring video block P have non-zero residual coefficients. If one or both of the input video block Q and the neighboring video block P have non-zero residual coefficients, the deblocking filter boundary strength parameter may be set to 1. If neither of the input video block Q or the neighboring video block P have non-zero residual coefficients, the deblocking filter boundary strength calculation process 800 may proceed to 830.

At 830, it may be determined whether at least one of the reference pictures used by the neighboring video block P and at least one of the reference pictures used by the input video block Q are different. If at least one of the reference pictures used by the neighboring video block P and at least one of the reference pictures used by the input video block Q are different, the deblocking filter boundary strength parameter may be set to 1. If the reference pictures used by the neighboring video block P and the reference pictures used by the input video block Q are the same, the deblocking filter boundary strength calculation process 800 may proceed to 840.

At 840, it may be determined whether the absolute differences between the horizontal and vertical components of respective motion vectors of the neighboring video block P and the input video block Q are one pixel or more. If the absolute differences between the horizontal and vertical components of the respective motion vectors of the neighboring video block P and the input video block Q are one pixel or more, the deblocking filter boundary strength parameter may be set to 1.

If none of the conditions of 820, 830, or 840 are true, the deblocking filter boundary strength parameter may be set to 0. It should be appreciated that the example deblocking filter boundary strength calculation process 800 is not limited to the illustrated order. For example, one or more parts of the example deblocking filter boundary strength calculation process 800 may be carried out in a different order. One or more parts of the example deblocking filter boundary strength calculation process 800 may be omitted.

In an SVC system (e.g., as depicted in FIGS. 2 and 3), one or more deblocking filters may be used by a BL encoder and/or decoder, for example to reduce blocking artifacts. However the deblocking filters in the BL may not be able to smooth out one or more discontinuities along respective block edges in the reconstructed BL video. For example, the one or more deblocking filters may be bypassed for one or more color components, for example if the boundary strength is below a threshold. When the one or more deblocking filters are applied, associated filter characteristics may not be strong enough for one or more types of block edges.

A boundary strength decision process, for example as used by a single layer codec, may not result in a deblocking filter that is optimal for scalable coding. For example, discontinuity remaining after deblocking, which may or may not be visible to the human eye (e.g., when the BL video is displayed), may reduce the effectiveness of ILP and/or may detrimentally affect coding efficiency of the EL video. This may be exacerbated by select types of inter layer processing. For example, applying one or more upsampling filters for spatial scalability may introduce ringing artifacts to an upsampled inter layer reference. Ringing artifacts may be particularly pronounced around block edges, where blocking artifacts may be located. If this upsampled inter layer reference picture is used to predict EL video (e.g., by inserting it into an EL decoded picture buffer (DPB)), the discontinuity and/or ringing artifacts around the block edges may result in a high EL prediction residual. Such an EL prediction residual may be difficult to quantize and/or to code.

Inter layer prediction for scalable video coding may be implemented using enhanced deblocking filters. For example, deblocking filters may be adapted by adjusting a deblocking filter boundary strength calculation process for scalable coding. A boundary strength calculation process at the EL encoder and/or decoder may be adjusted, for example if inter layer reference pictures are used in prediction.

Video blocks may be predicted using uni-prediction, using bi-prediction, or may otherwise be predicted. In uni-prediction, a prediction block may come from one reference picture. In bi-prediction, a prediction block may come from averaging respective blocks from two reference pictures.

Figure 9:
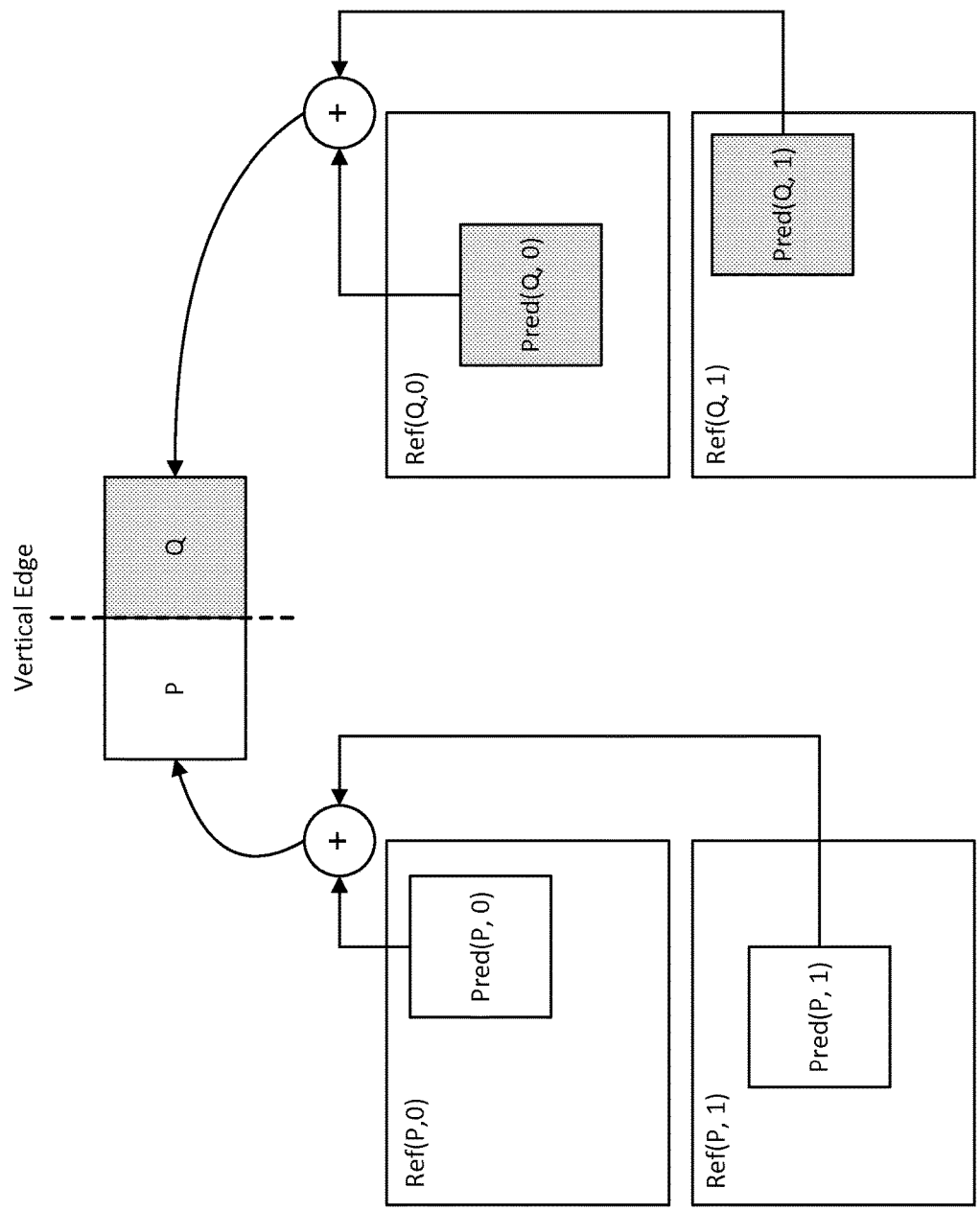
FIG. 9 depicts an example of video block prediction using bi-prediction.

FIG. 9 depicts an example of video block prediction using bi-prediction. A neighboring video block P may be predicted using an average of pred(P, 0) and pred(P, 1), which may come from reference pictures ref(P, 0) and ref(P, 1), respectively. An input video block Q may be predicted using an average of pred(Q, 0) and pred(Q, 1), which may come from reference pictures ref(Q, 0) and ref(Q, 1), respectively. One or more of the references pictures ref(P, 0), ref(P, 1), ref(Q, 0) and ref(Q, 1) may represent one or more reference pictures in the EL DPB. One or more of the references pictures ref(P, 0), ref(P, 1), ref(Q, 0) and ref(Q, 1) may be inter layer reference pictures. In an example, if one or more of ref(P, 0), ref(P, 1), ref(Q, 0) and ref(Q, 1) represent different pictures in the EL DPB, the boundary strength parameter Bs may be set to 1.

When coding the enhancement layer video in a scalable video coding system, a subset of the reference pictures used may be inter layer reference pictures. For example, one or more of the reference pictures may come from an ILP unit. One or more remaining reference pictures may be temporal reference pictures, for example from the same enhancement layer. If the inter layer reference pictures and temporal reference pictures have different characteristics, it may be beneficial to at least partially account for such differences while determining a boundary strength for use between an input video block Q and a neighboring video block P.

For example, because inter layer reference pictures may have greater signal discontinuity along one or more block edges, it may be beneficial to increase the boundary strength value if one or more references pictures (e.g., ref(P, 0), ref(P, 1), ref(Q, 0) and ref(Q, 1)) represent inter layer reference pictures. In another example, because larger blocks may suffer more severe blocking artifacts, it may be beneficial to increase the boundary strength in accordance with the large block sizes. In yet another example, because the deblocking filters in a base layer may not be strong enough to remove block edges between intra coded blocks, it may be beneficial to increase boundary strength if the corresponding base layer blocks are coded using intra mode.

One or more deblocking filters may be implemented that are configured to account for one or more conditions that may be present in inter layer reference pictures, such as those described above. Such deblocking filters may be used to implement an adaptive process of boundary strength calculation, for example as may be performed by the EL encoder and/or decoder of a scalable coding system. The adaptive process of boundary strength calculation may be referred to as an enhanced boundary strength calculation.

The boundary strength between video blocks (e.g., between an input video block Q and a neighboring video block P) may be set to an increased value (e.g., 2) using an enhanced boundary strength calculation. An enhance boundary strength calculation may be performed, for example, if one or more of the following conditions are true: at least one of the neighboring video block P or the input video block Q is predicted using inter layer prediction, at least one of the neighboring video block P or the input video block Q is predicted using large partition; and at least one of the neighboring video block P or the input video block Q have corresponding base layer blocks (e.g., Pb and Qb) that are coded using intra mode.

An enhanced boundary strength calculation may be performed if at least one of an input video block Q or a neighboring video block P is predicted using inter layer prediction. For example, if the neighboring video block P is predicted using uni-prediction and its reference picture (e.g., ref(P, 0) or ref(P, 1)) represents an inter layer reference, then the neighboring video block P may be considered to be inter layer predicted. If the neighboring video block P is predicted using bi-prediction and both of its reference pictures (e.g., ref(P, 0) and ref(P, 1)) are inter layer references, then the neighboring video block P may be considered to be inter layer predicted.

An enhanced boundary strength calculation may be performed if at least one of an input video block Q or a neighboring video block P is predicted using a large partition. Video blocks may be partitioned in varying sizes, for example from 4×4 to 64×64. Video block partitions may be square (e.g., 4×4, 64×64, etc.) or non-square (e.g., 4×2, 64×32, etc.). In an example of enhanced boundary strength calculation using large partition, a video block (e.g., a neighboring block P) may be considered a large partition video block if a size of the video block exceeds a partition size threshold. A partition size threshold may be for example, a pixel area of the video block, a dimension (e.g., maximum dimension) of the video block (e.g., height of the video block, width of the video block), or the like. A partition size threshold may be specified on a per video stream basis. A partition size threshold may be predetermined (e.g., fixed). Such a partition size threshold may be signaled (e.g., signaled by an encoder in a video bitstream). A video coding system may be configured to implement an adaptable partition size threshold. An adapted partition size threshold may be signaled (e.g., signaled by an encoder in a video bitstream). In another example of enhanced boundary strength calculation using large partition, a video block (e.g., a neighboring block P) may be considered a large partition video block if the video block has the partition mode of PART_2N×2N (e.g., as defined in accordance with HEVC).

An enhanced boundary strength calculation may be performed if at least one video block (e.g., at least one of an input video block Q or a neighboring video block P) have one or more corresponding base layer blocks (e.g., Pb and Qb) that are coded using intra mode. For example, as depicted in FIG. 10, depending on the coordinates of an EL block, a video block (e.g., a neighboring video block P) in the EL may correspond to one or more base layer coded blocks (e.g., one, two, or four base layer coded blocks).

Figure 10:
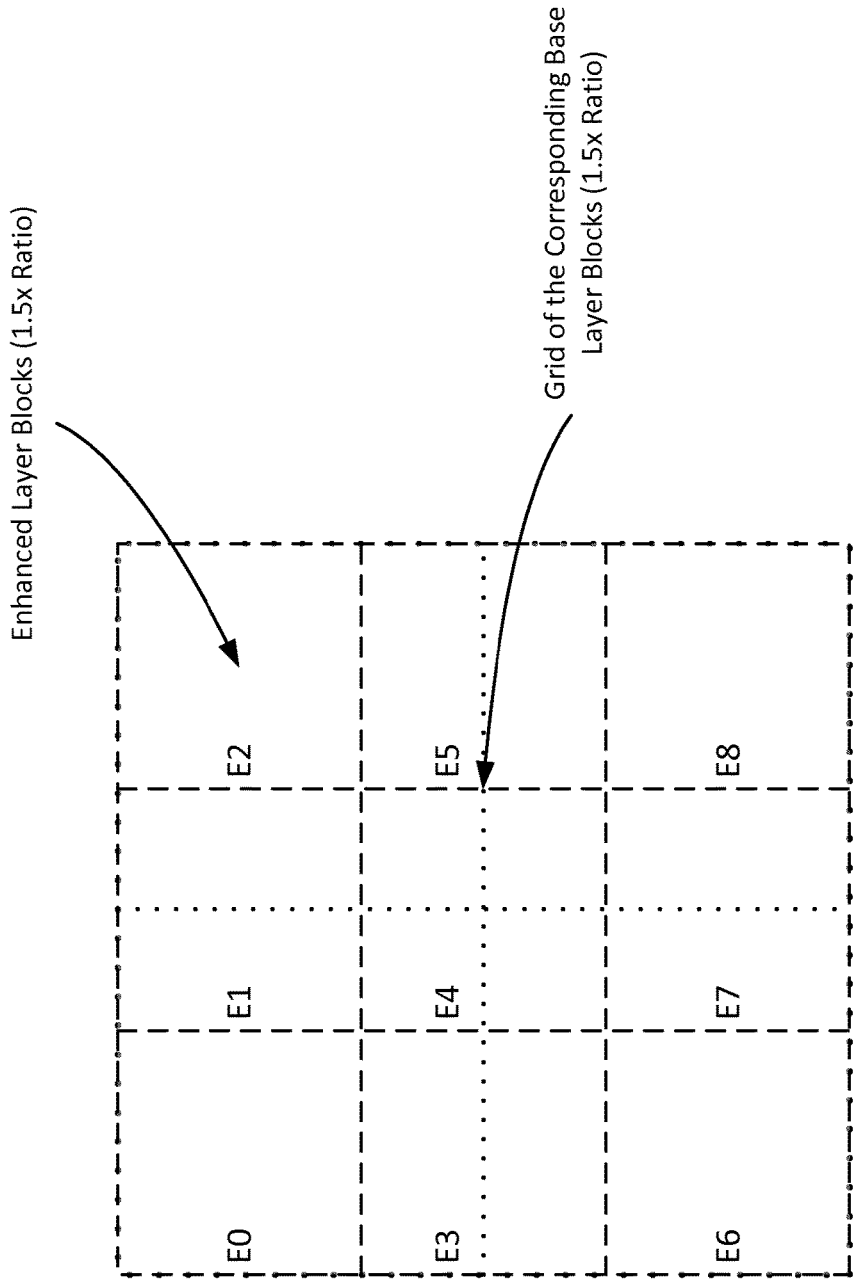
FIG. 10 depicts an example video block that has corresponding base layer blocks.

Using a scaling ratio of 1.5× as an example, FIG. 10 illustrates that, depending on the coordinates of the EL block, a video block (e.g., a video block P) in the EL may correspond to one, two, or four base layer coded blocks, such that Pb may be a collection of blocks {Pbi}. To illustrate, if a video block P is the block E0, E2, E6 or E8, the corresponding base layer block {Pbi} may cover one block. If the video block P is the block E1, E3, E5, or E7, the corresponding base layer blocks {Pbi} may cover two blocks. If the video block P is the block E4, then the corresponding base layer blocks {Pbi} may cover four blocks. Similar observations may be made for other scaling ratios. For example, if at least one of {Pbi} is intra coded, the EL video block P may be considered to have corresponding base layer blocks that are intra coded. In another example, the EL video block P may be considered to correspond to intra coded base layer blocks if the corresponding base layer blocks {Pbi} (e.g., all of the corresponding base layer blocks {Pbi}) are intra coded.

Whether one or more of the reference pictures (e.g., ref(P, 0), ref(P, 1), ref(Q, 0), and ref(Q, 1)) used to code a neighboring video block P or an input video block Q are inter layer references may be identified. In an example, the time stamp of one or more reference pictures may be checked. If the time stamp is substantially the same as that of an EL picture being coded, the reference picture may be an inter layer reference. The time stamp associated with a picture may be recorded by a variable called picture order count (POC). In another example, an inter layer reference may be labeled as a long term reference picture, for example when it is stored in the EL DPB. When an inter layer reference is labeled as a long term reference picture in the EL DPB, one or more motion vectors (MVs) in the inter layer reference may be used for motion vector prediction (MVP), for example directly. Marking inter layer reference pictures as long term reference pictures may increase the coding efficiency of the enhancement layer. For example, motion vector prediction between MVs pointing to inter layer reference pictures and MVs pointing to other enhancement layer reference pictures may be prevented. The characteristics between MVs pointing to inter layer reference pictures and MVs pointing to other enhancement layer reference pictures may exhibit differences.

Figure 11:
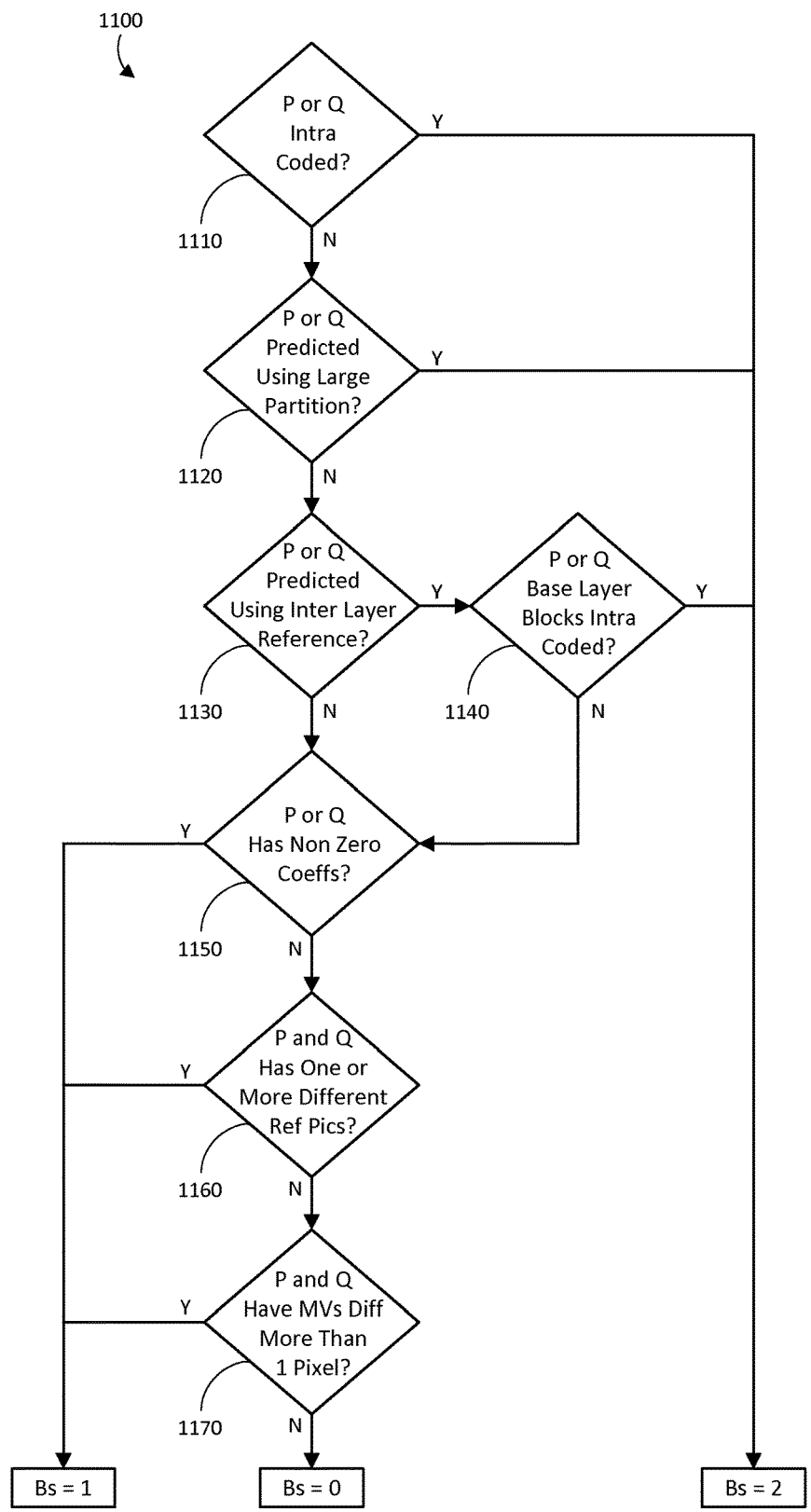
FIG. 11 depicts another example process for calculating the boundary strength parameter of a deblocking filter.

FIG. 11 depicts an example enhanced boundary strength calculation process flow 1100. As shown, deblocking filter boundary strength values of 0 to 2 may be defined. At 1110, it may be determined whether one or both of an input video block Q or a neighboring video block P was coded using intra mode. If one or both of the input video block Q and the neighboring video block P were coded using intra mode, the deblocking filter boundary strength parameter may be set to 2. When the boundary strength parameter is set to 2, a strong deblocking filter may be applied between the neighboring video block P and the input video block Q.

If neither of the input video block Q or the neighboring video block P were coded using intra mode, the neighboring video block P and the input video block Q may have been coded using inter mode. If the neighboring video block P and the input video block Q were coded using inter mode, the deblocking filter boundary strength parameter may be set to 2 (e.g., when the condition of 1120 is true, or the conditions of 1130 and 1140 are true), may be set to 1 (e.g., when one or more of the conditions of 1150, 1160, or 1170 are true), or may be set to 0 (e.g., when none of the conditions of 1120, 1130, 1140, 1150, 1160, or 1170 are true).

At 1120, it may be determined whether at least one of the input video block Q or the neighboring video block P were predicted using a large partition. If at least one of the input video block Q or the neighboring video block P were predicted using a large partition, the deblocking filter boundary strength parameter may be set to 2. If neither of the input video block Q or the neighboring video block P were predicted using a large partition, the enhanced boundary strength calculation process 1100 may proceed to 1130.

At 1130, it may be determined whether at least one of the input video block Q or the neighboring video block P were predicted using inter layer prediction (e.g., using an inter layer reference). If at least one of the input video block Q or the neighboring video block P were predicted using inter layer prediction, the enhanced boundary strength calculation process 1100 may proceed to 1140. If neither of the input video block Q or the neighboring video block P were predicted using inter layer prediction, the enhanced boundary strength calculation process 1100 may proceed to 1150 (e.g., omitting 1140).

At 1140, it may be determined whether at least one of the input video block Q or the neighboring video block P have one or more corresponding base layer blocks that were coded using intra mode. If at least one of the input video block Q or the neighboring video block P have one or more corresponding base layer blocks that were coded using intra mode, the deblocking filter boundary strength parameter may be set to 2. If neither of the input video block Q or the neighboring video block P have one or more corresponding base layer blocks that were coded using intra mode, the enhanced boundary strength calculation process 1100 may proceed to 1150.

If the condition of 1120 is false and the conditions of 1130 and 1140 are false, at 1150 it may be determined whether one or both of the input video block Q or the neighboring video block P have non-zero residual coefficients. If one or both of the input video block Q and the neighboring video block P have non-zero residual coefficients, the deblocking filter boundary strength parameter may be set to 1. If neither of the input video block Q or the neighboring video block P have non-zero residual coefficients, the enhanced boundary strength calculation process 1100 may proceed to 1160.

At 1160, it may be determined whether at least one of the reference pictures used by the neighboring video block P and at least one of the reference pictures used by the input video block Q are different. If at least one of the reference pictures used by the neighboring video block P and at least one of the reference pictures used by the input video block Q are different, the deblocking filter boundary strength parameter may be set to 1. If the reference pictures used by the neighboring video block P and the reference pictures used by the input video block Q are the same, the enhanced boundary strength calculation process 1100 may proceed to 1170.

At 1170, it may be determined whether the absolute differences between the horizontal and vertical components of respective motion vectors of the neighboring video block P and the input video block Q are one pixel or more. If the absolute differences between the horizontal and vertical components of the respective motion vectors of the neighboring video block P and the input video block Q are one pixel or more, the deblocking filter boundary strength parameter may be set to 1.

If none of the conditions of 1110, 1120, 1130, 1150, 1160, or 1170 are true, the deblocking filter boundary strength parameter may be set to 0. It should be appreciated that the example enhanced boundary strength calculation process 1100 is not limited to the illustrated order. For example, one or more parts of the example enhanced boundary strength calculation process 1100 may be carried out in a different order. One or more parts of the example enhanced boundary strength calculation process 1100 may be omitted.

Figure 12:
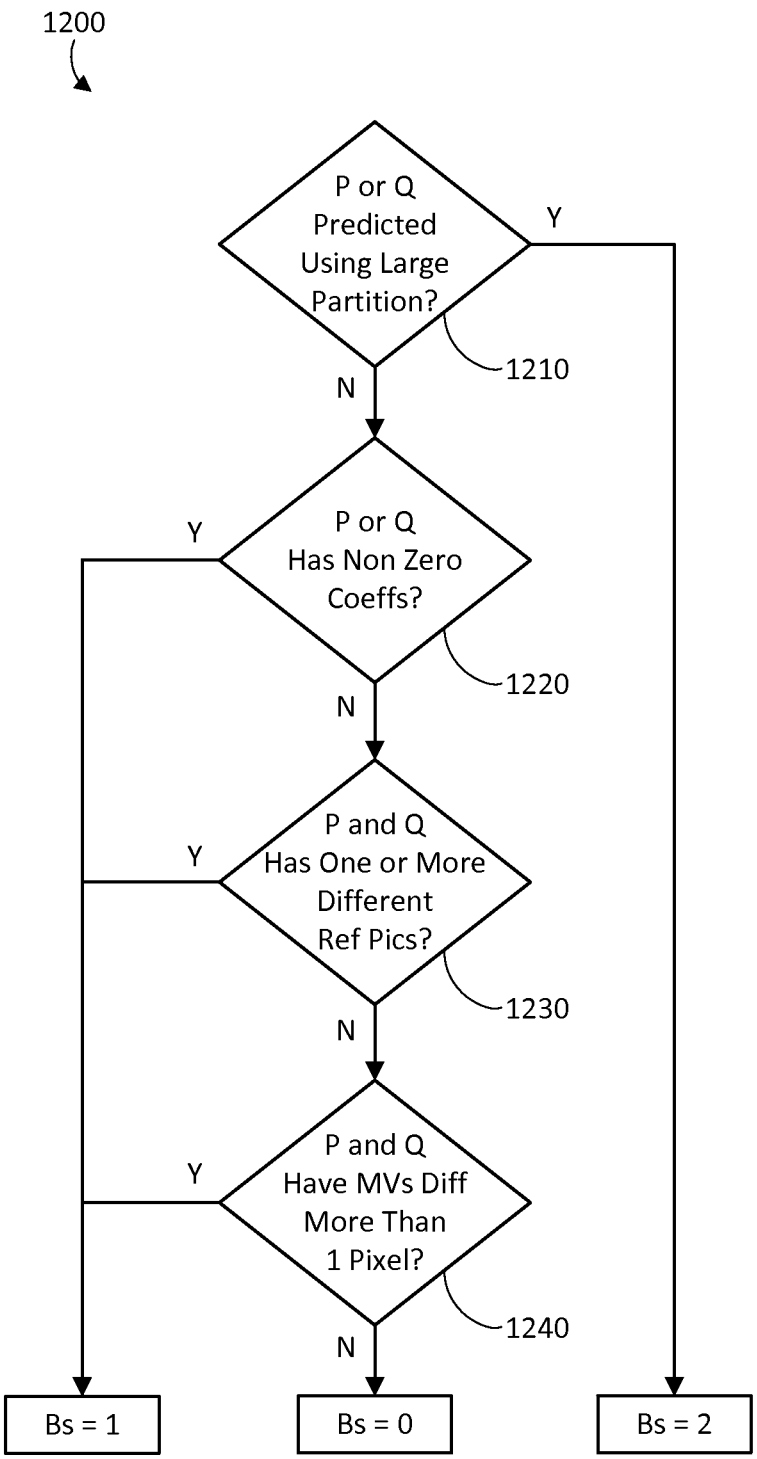
FIG. 12 depicts another example process for calculating the boundary strength parameter of a deblocking filter.

FIG. 12 depicts an example enhanced boundary strength calculation process flow 1200. As shown, deblocking filter boundary strength values of 0 to 2 may be defined. At 1210, it may be determined whether at least one of an input video block Q or a neighboring video block P of the input video block Q were predicted using a large partition. If at least one of the input video block Q or the neighboring video block P were predicted using a large partition, the deblocking filter boundary strength parameter may be set to 2. When the boundary strength parameter is set to 2, a strong deblocking filter may be applied between the neighboring video block P and the input video block Q. If neither of the input video block Q or the neighboring video block P were predicted using a large partition, the enhanced boundary strength calculation process 1200 may proceed to 1220.

At 1220 it may be determined whether one or both of the input video block Q or the neighboring video block P have non-zero residual coefficients. If one or both of the input video block Q and the neighboring video block P have non-zero residual coefficients, the deblocking filter boundary strength parameter may be set to 1. If neither of the input video block Q or the neighboring video block P have non-zero residual coefficients, the enhanced boundary strength calculation process 1200 may proceed to 1230.

At 1230, it may be determined whether at least one of the reference pictures used by the neighboring video block P and at least one of the reference pictures used by the input video block Q are different. If at least one of the reference pictures used by the neighboring video block P and at least one of the reference pictures used by the input video block Q are different, the deblocking filter boundary strength parameter may be set to 1. If the reference pictures used by the neighboring video block P and the reference pictures used by the input video block Q are the same, the enhanced boundary strength calculation process 1200 may proceed to 1240.

At 1240, it may be determined whether the absolute differences between the horizontal and vertical components of respective motion vectors of the neighboring video block P and the input video block Q are one pixel or more. If the absolute differences between the horizontal and vertical components of the respective motion vectors of the neighboring video block P and the input video block Q are one pixel or more, the deblocking filter boundary strength parameter may be set to 1.

If none of the conditions of 1210, 1220, 1230, or 1240 are true, the deblocking filter boundary strength parameter may be set to 0. It should be appreciated that the example enhanced boundary strength calculation process 1200 is not limited to the illustrated order. For example, one or more parts of the example enhanced boundary strength calculation process 1200 may be carried out in a different order. One or more parts of the example enhanced boundary strength calculation process 1200 may be omitted.

In an example implementation of the enhanced boundary strength calculation process 1200 (e.g., in a video coding system or a video coding device), a first video block (e.g., an input video block) of a video bitstream may be identified. A second video block (e.g., a neighboring video block of the input video block) of the video bitstream may be identified. The second video block may be a top neighbor of the first video block, for example if a horizontal edge of the first video block is being filtered. The second video block may be a left neighbor of the first video block, for example if a vertical edge of the first video block is being filtered.

A partition characteristic of the first video block (e.g., a first partition characteristic) may be determined. The first partition characteristic may be, for example, a partition size of the first video block. A deblocking filter (e.g., that is associated with the video coding system or the video coding device) may be adapted in accordance with the first partition characteristic (e.g., the first partition size). Adapting the deblocking filter may include assigning a value to a boundary strength parameter of the deblocking filter. For example, the deblocking filter may be assigned a first boundary strength parameter value if the partition size of the first video block is greater than or equal to a partition size threshold value. The deblocking filter may be assigned a second boundary strength parameter (e.g., that is lower than the first boundary strength parameter value) if the partition size of the first video block is less than the partition size threshold value.

A partition characteristic of the second video block (e.g., a second partition characteristic) may be determined. The second partition characteristic may be, for example, a partition size of the second video block. The deblocking filter may be adapted in accordance with one or both of the first and second partition characteristics (e.g., at least one of the first partition size or the second partition size). Adapting the deblocking filter may include assigning a value to a boundary strength parameter of the deblocking filter. For example, the deblocking filter may be assigned a first boundary strength parameter value if the partition size of at least one of the first or second video blocks is greater than or equal to a partition size threshold value. The deblocking filter may be assigned a second boundary strength parameter (e.g., that is lower than the first boundary strength parameter value) if the partition sizes of the first and second video blocks are less than the partition size threshold value.

The adapted deblocking filter may be applied to a portion of the video bitstream. The portion of the video bitstream may include at least one of the first or second video blocks. For example, the adapted deblocking filter may be applied along an edge between the first and second video blocks. It should be appreciated that the first partition characteristic is not limited to the partition size of the first video block. For example, the first partition characteristic may be a partition mode that pertains to the first video block (e.g., if the first video block has the partition mode of PART_2N×2N (e.g., as defined in accordance with HEVC).

Figure 13:
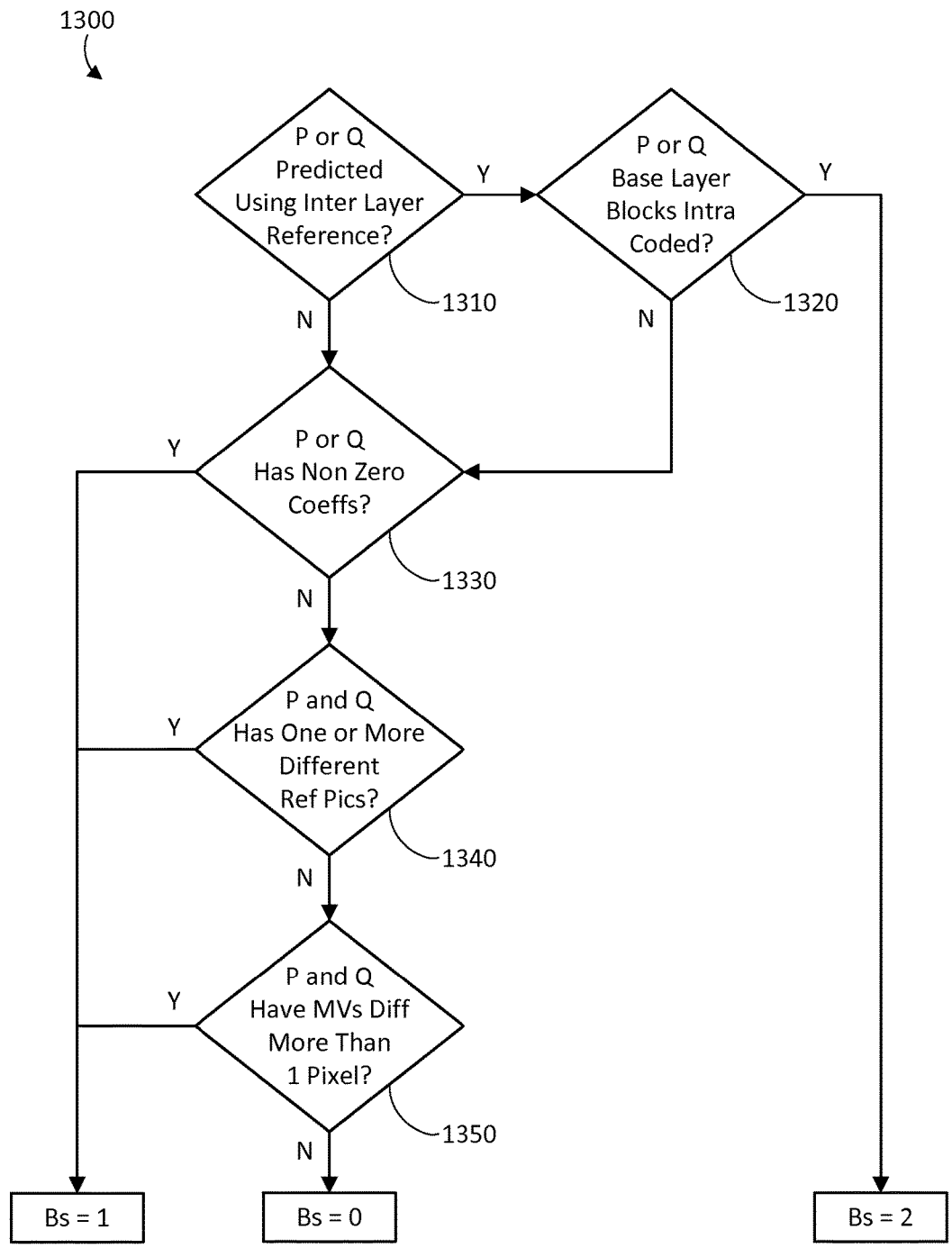
FIG. 13 depicts another example process for calculating the boundary strength parameter of a deblocking filter.

FIG. 13 depicts an example enhanced boundary strength calculation process flow 1300. As shown, deblocking filter boundary strength values of 0 to 2 may be defined. At 1310, it may be determined whether at least one of an input video block Q or a neighboring video block P of the input video block Q were predicted using inter layer prediction (e.g., using an inter layer reference). If at least one of the input video block Q or the neighboring video block P were predicted using inter layer prediction, the enhanced boundary strength calculation process 1300 may proceed to 1320. If neither of the input video block Q or the neighboring video block P were predicted using inter layer prediction, the enhanced boundary strength calculation process 1300 may proceed to 1330 (e.g., omitting 1320).

At 1320, it may be determined whether at least one of the input video block Q or the neighboring video block P have one or more corresponding base layer blocks that were coded using intra mode. If at least one of the input video block Q or the neighboring video block P have one or more corresponding base layer blocks that were coded using intra mode, the deblocking filter boundary strength parameter may be set to 2. When the boundary strength parameter is set to 2, a strong deblocking filter may be applied between the neighboring video block P and the input video block Q. If neither of the input video block Q or the neighboring video block P have one or more corresponding base layer blocks that were coded using intra mode, the enhanced boundary strength calculation process 1300 may proceed to 1330.

At 1330 it may be determined whether one or both of the input video block Q or the neighboring video block P have non-zero residual coefficients. If one or both of the input video block Q and the neighboring video block P have non-zero residual coefficients, the deblocking filter boundary strength parameter may be set to 1. If neither of the input video block Q or the neighboring video block P have non-zero residual coefficients, the enhanced boundary strength calculation process 1300 may proceed to 1340.

At 1340, it may be determined whether at least one of the reference pictures used by the neighboring video block P and at least one of the reference pictures used by the input video block Q are different. If at least one of the reference pictures used by the neighboring video block P and at least one of the reference pictures used by the input video block Q are different, the deblocking filter boundary strength parameter may be set to 1. If the reference pictures used by the neighboring video block P and the reference pictures used by the input video block Q are the same, the enhanced boundary strength calculation process 1300 may proceed to 1350.

At 1350, it may be determined whether the absolute differences between the horizontal and vertical components of respective motion vectors of the neighboring video block P and the input video block Q are one pixel or more. If the absolute differences between the horizontal and vertical components of the respective motion vectors of the neighboring video block P and the input video block Q are one pixel or more, the deblocking filter boundary strength parameter may be set to 1.

If none of the conditions of 1310, 1330, 1340, or 1350 are true, the deblocking filter boundary strength parameter may be set to 0. It should be appreciated that the example enhanced boundary strength calculation process 1300 is not limited to the illustrated order. For example, one or more parts of the example enhanced boundary strength calculation process 1300 may be carried out in a different order. One or more parts of the example enhanced boundary strength calculation process 1300 may be omitted.

In an example implementation of the enhanced boundary strength calculation process 1300 (e.g., in a video coding system or a video coding device), a first video block (e.g., an input video block) of a video bitstream may be identified. A second video block (e.g., a neighboring video block of the input video block) of the video bitstream may be identified. The second video block may be a top neighbor of the first video block, for example if a horizontal edge of the first video block is being filtered. The second video block may be a left neighbor of the first video block, for example if a vertical edge of the first video block is being filtered.

A first determination pertaining to one or both of the first video block and the second video block may be made. The first determination may be, for example, a determination of whether at least one of the first video block or the second video block was predicted using inter layer prediction. A determination of whether at least one of the first or second video blocks was predicted using inter layer prediction may include, for example, determining whether at least one reference picture, for example a reference picture used to predict the first video block or a reference picture used to predict the second video block, represents an inter layer reference. Determining whether at least one reference picture used to predict the first video block or the second video block represents an inter layer reference may include, for example, comparing a time stamp of the at least one reference picture with a time stamp of an enhancement layer picture.

A second determination pertaining to the first video block may be made. The second determination may be related to result of the first determination. For example, if the result of the first determination is that the first video block was predicted using inter layer prediction, the second determination may be a determination of whether a corresponding base layer block of the first video block was coded using intra mode. Whether the second determination is performed may be based upon the result of the first determination. For example, if the result of the first determination is that the first video block was not predicted using inter layer prediction, the second determination may not be performed.

A deblocking filter (e.g., that is associated with the video coding system or the video coding device) may be adapted in accordance with the first and/or second determinations. Adapting the deblocking filter may include assigning a value to a boundary strength parameter of the deblocking filter. In an example implementation, the deblocking filter may be assigned a first boundary strength parameter value if the first determination is false (e.g., if neither of the first and second video blocks were predicted using inter layer prediction).

The deblocking filter may be assigned a second boundary strength parameter value (e.g., that is lower than the first boundary strength parameter value) if the first and second determinations are true (e.g., if the at least one of the first or second video blocks was predicted using inter layer prediction and a corresponding base layer block (e.g., of the video block that was predicted using inter layer prediction) was coded using intra mode).

The adapted deblocking filter may be applied to a portion of the video bitstream. The portion of the video bitstream may include at least one of the first or second video blocks. For example, the adapted deblocking filter may be applied along an edge between the first and second video blocks.

When the boundary strength Bs of a deblocking filter applied between video blocks (e.g., between an input video block Q and a neighboring video block P) is calculated using an enhanced boundary strength calculation (e.g., such that the Bs is increased), one or more strong deblocking filters may be applied. The application of stronger deblocking filters may smooth out one or more blocking artifacts. This may be beneficial, for example, for the chroma components of a video block, for which a deblocking filter may be applied when Bs is equal to 2, for example.

Whether an enhanced deblocking filter process (e.g., including an enhanced boundary strength calculation process such as those described herein) is used (e.g., to reconstruct EL video) may be signaled in the bitstream. For example, one or more sequence level and/or picture (e.g., slice) level flags may be added to the bitstream that may indicate whether an enhanced deblocking process (e.g., as depicted in FIGS. 11, 12, and 13) is applied, or a regular deblocking process (e.g., as depicted in FIG. 8) is applied. For sequence level signaling, one or more flags may be added to one or more high level parameter sets, such as a video parameter set (VPS), a sequence parameter set (SPS), and/or a picture parameter set (PPS).

The table depicted in FIG. 14 illustrates an example of adding a one-bit flag to an SPS to indicate whether use of an enhanced deblocking filter is allowed at the video sequence level. For picture (e.g., slice) level signaling, the table depicted in FIG. 15 gives an example of adding a one-bit flag to the slice header to indicate whether an enhanced deblocking filter is used to reconstruct one or more blocks in a slice (e.g., a current slice). It should be appreciated the application of enhanced deblocking filters is not limited to use in a scalable video coding system, for example as illustrated in the example tables of FIGS. 14 and 15. For example, enhanced deblocking filters may be applied in a single layer video coding system (e.g., by the example encoder depicted in FIG. 4 and the example decoder depicted in FIG. 5). To illustrate, with reference to FIGS. 14 and 15, enhanced deblocking filters may be applied in a single layer video coding system by, for example, omitting the condition nuh_layer_id>0.

Setting sps_inter_layer_deblocking_enabled_flag equal to 0 may indicate that the deblocking filters used to reconstruct one or more pictures in a layer (e.g., a current layer) identified by nuh_layer_id are not configured to account for inter layer reference picture characteristics. Setting sps_inter_layer_deblocking_enabled_flag equal to 1 may indicate that one or more enhanced deblocking filters configured to account for inter layer reference picture characteristics are used to reconstruct one or more pictures in the current layer identified by nuh_layer_id.

Setting slice_interlayer_deblocking_enabled_flag equal to 0 may indicate that the deblocking filters used to reconstruct one or more pictures in a slice (e.g., a current slice) are not configured to account for inter layer reference pictures characteristics. Setting slice_inter_layer_deblocking_enabled_flag equal to 1 may indicate that one or more enhanced deblocking filters configured to account for inter layer reference picture characteristics are used to reconstruct the current slice.

The herein described enhanced deblocking filters and enhanced boundary strength calculation processes, and techniques associated therewith, may be implemented in accordance with encoding and/or decoding video (e.g., digital video bitstreams) in a wireless communication system, such as the example wireless communication system 1600 and/or components thereof illustrated in FIGS. 16A-16E.

Figure 16A:
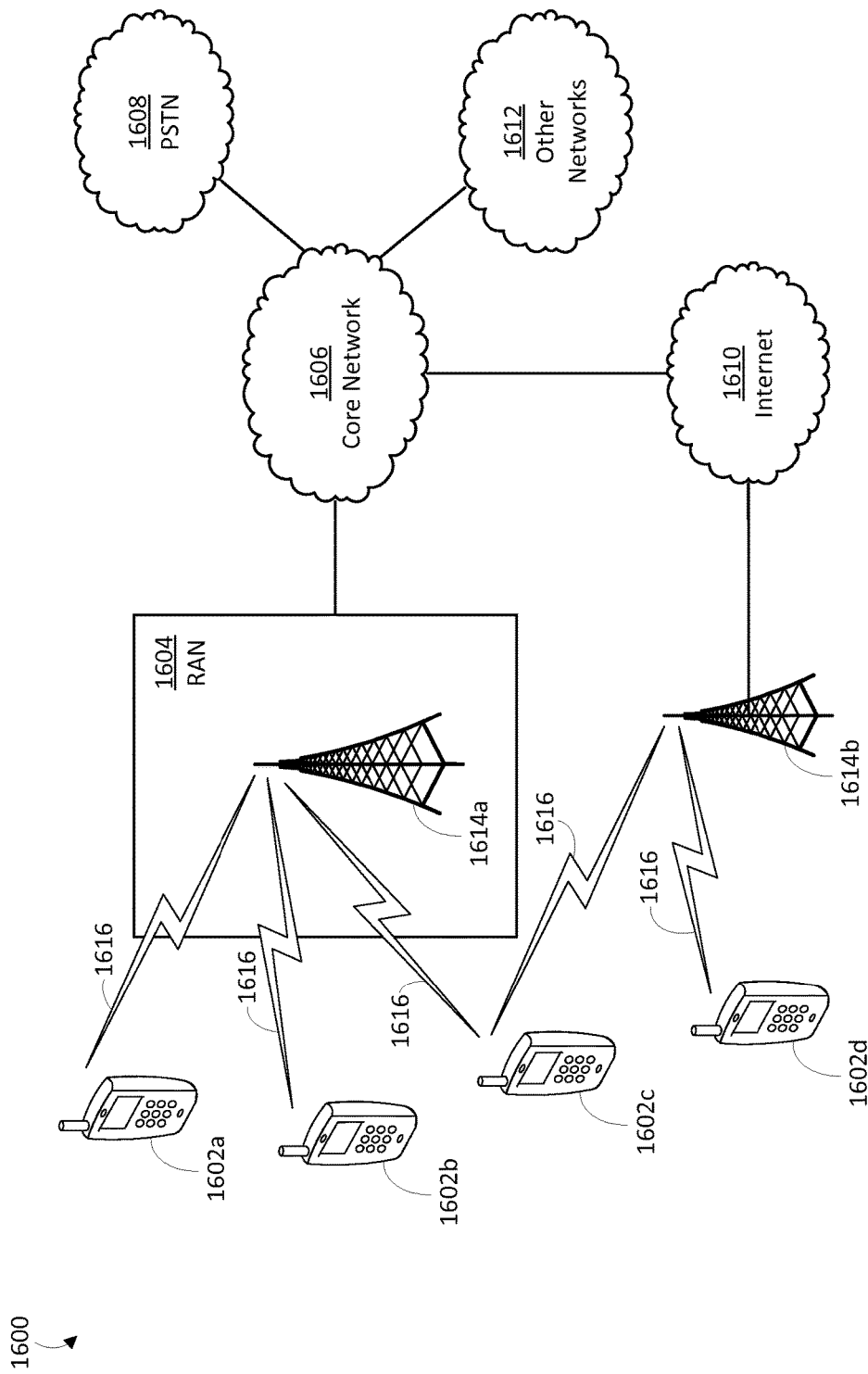
FIG. 16A depicts a system diagram of an example communications system in which one or more disclosed embodiments may be implemented.

FIG. 16A is a diagram of an example communications system 1600 in which one or more disclosed embodiments may be implemented. The communications system 1600 may be a multiple access system that provides content, such as voice, data, video, messaging, broadcast, etc., to multiple wireless users. The communications system 1600 may enable multiple wireless users to access such content through the sharing of system resources, including wireless bandwidth. For example, the communications systems 1600 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 16A, the communications system 1600 may include at least one wireless transmit/receive unit (WTRU), such as a plurality of WTRUs, for instance WTRUs 1602a, 1602b, 1602c, and 1602d, a radio access network (RAN) 1604, a core network 1606, a public switched telephone network (PSTN) 1608, the Internet 1610, and other networks 1612, though it should be appreciated that the disclosed embodiments contemplate any number of WTRUs, base stations, networks, and/or network elements. Each of the WTRUs 1602a, 1602b, 1602c, 1602d may be any type of device configured to operate and/or communicate in a wireless environment. By way of example, the WTRUs 1602a, 1602b, 1602c. 1602d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1600 may also include a base station 1614a and a base station 1614b. Each of the base stations 1614a, 1614b may be any type of device configured to wirelessly interface with at least one of the WTRUs 1602a, 1602b, 1602c, 1602d to facilitate access to one or more communication networks, such as the core network 1606, the Internet 1610, and/or the networks 1612. By way of example, the base stations 1614a, 1614b may be a base transceiver station (BTS), a Node-B, an eNode B, a Home Node B, a Home eNode B, a site controller, an access point (AP), a wireless router, and the like. While the base stations 1614a, 1614b are each depicted as a single element, it should be appreciated that the base stations 1614a, 1614b may include any number of interconnected base stations and/or network elements.

The base station 1614a may be part of the RAN 1604, which may also include other base stations and/or network elements (not shown), such as a base station controller (BSC), a radio network controller (RNC), relay nodes, etc. The base station 1614a and/or the base station 1614b may be configured to transmit and/or receive wireless signals within a particular geographic region, which may be referred to as a cell (not shown). The cell may further be divided into cell sectors. For example, the cell associated with the base station 1614a may be divided into three sectors. Thus, in one embodiment, the base station 1614a may include three transceivers, i.e., one for each sector of the cell. In another embodiment, the base station 1614a may employ multiple-input multiple output (MIMO) technology and, therefore, may utilize multiple transceivers for each sector of the cell.

The base stations 1614a, 1614b may communicate with one or more of the WTRUs 1602a, 1602b, 1602c, 1602d over an air interface 1616, which may be any suitable wireless communication link (e.g., radio frequency (RF), microwave, infrared (IR), ultraviolet (UV), visible light, etc.). The air interface 1616 may be established using any suitable radio access technology (RAT).

More specifically, as noted above, the communications system 1600 may be a multiple access system and may employ one or more channel access schemes, such as CDMA, TDMA, FDMA, OFDMA, SC-FDMA, and the like. For example, the base station 1614a in the RAN 1604 and the WTRUs 1602a, 1602b, 1602c may implement a radio technology such as Universal Mobile Telecommunications System (UMTS) Terrestrial Radio Access (UTRA), which may establish the air interface 1616 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1614a and the WTRUs 1602a. 1602b, 1602c may implement a radio technology such as Evolved UMTS Terrestrial Radio Access (E-UTRA), which may establish the air interface 1616 using Long Term Evolution (LTE) and/or LTE-Advanced (LTE-A).

In other embodiments, the base station 1614a and the WTRUs 1602a, 1602b, 1602c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95). Interim Standard 856 (IS-856), Global System for Mobile communications (GSM), Enhanced Data rates for GSM Evolution (EDGE), GSM EDGE (GERAN), and the like.

The base station 1614b in FIG. 16A may be a wireless router, Home Node B. Home eNode B, or access point, for example, and may utilize any suitable RAT for facilitating wireless connectivity in a localized area, such as a place of business, a home, a vehicle, a campus, and the like. In one embodiment, the base station 1614b and the WTRUs 1602c, 1602d may implement a radio technology such as IEEE 802.11 to establish a wireless local area network (WLAN). In another embodiment, the base station 1614b and the WTRUs 1602c, 1602d may implement a radio technology such as IEEE 802.15 to establish a wireless personal area network (WPAN). In yet another embodiment, the base station 1614b and the WTRUs 1602c, 1602d may utilize a cellular-based RAT (e.g., WCDMA, CDMA2000, GSM, LTE, LTE-A, etc.) to establish a picocell or femtocell. As shown in FIG. 16A, the base station 1614b may have a direct connection to the Internet 1610. Thus, the base station 1614b may not be required to access the Internet 1610 via the core network 1606.

The RAN 1604 may be in communication with the core network 1606, which may be any type of network configured to provide voice, data, applications, and/or voice over internet protocol (VoIP) services to one or more of the WTRUs 1602*a*. 1602*b*, 1602*c*. 1602*d*. For example, the core network 1606 may provide call control, billing services, mobile location-based services, pre-paid calling, Internet connectivity, video distribution, etc., and/or perform high-level security functions, such as user authentication. Although not shown in FIG. 16A, it should be appreciated that the RAN 1604 and/or the core network 1606 may be in direct or indirect communication with other RANs that employ the same RAT as the RAN 1604 or a different RAT. For example, in addition to being connected to the RAN 1604, which may be utilizing an E-UTRA radio technology, the core network 1606 may also be in communication with another RAN (not shown) employing a GSM radio technology.

The core network 1606 may also serve as a gateway for the WTRUs 1602*a*, 1602*b*, 1602*c*, 1602*d* to access the PSTN 1608, the Internet 1610, and/or other networks 1612. The PSTN 1608 may include circuit-switched telephone networks that provide plain old telephone service (POTS). The Internet 1610 may include a global system of interconnected computer networks and devices that use common communication protocols, such as the transmission control protocol (TCP), user datagram protocol (UDP) and the internet protocol (IP) in the TCP/IP internet protocol suite. The networks 1612 may include wired or wireless communications networks owned and/or operated by other service providers. For example, the networks 1612 may include another core network connected to one or more RANs, which may employ the same RAT as the RAN 1604 or a different RAT.

Some or all of the WTRUs 1602*a*, 1602*b*, 1602*c*, 1602*d* in the communications system 1600 may include multi-mode capabilities, i.e., the WTRUs 1602*a*, 1602*b*, 1602*c*, 1602*d* may include multiple transceivers for communicating with different wireless networks over different wireless links. For example, the WTRU 1602*c* shown in FIG. 16A may be configured to communicate with the base station 1614*a*, which may employ a cellular-based radio technology, and with the base station 1614*b*, which may employ an IEEE 802 radio technology.

Figure 16B:
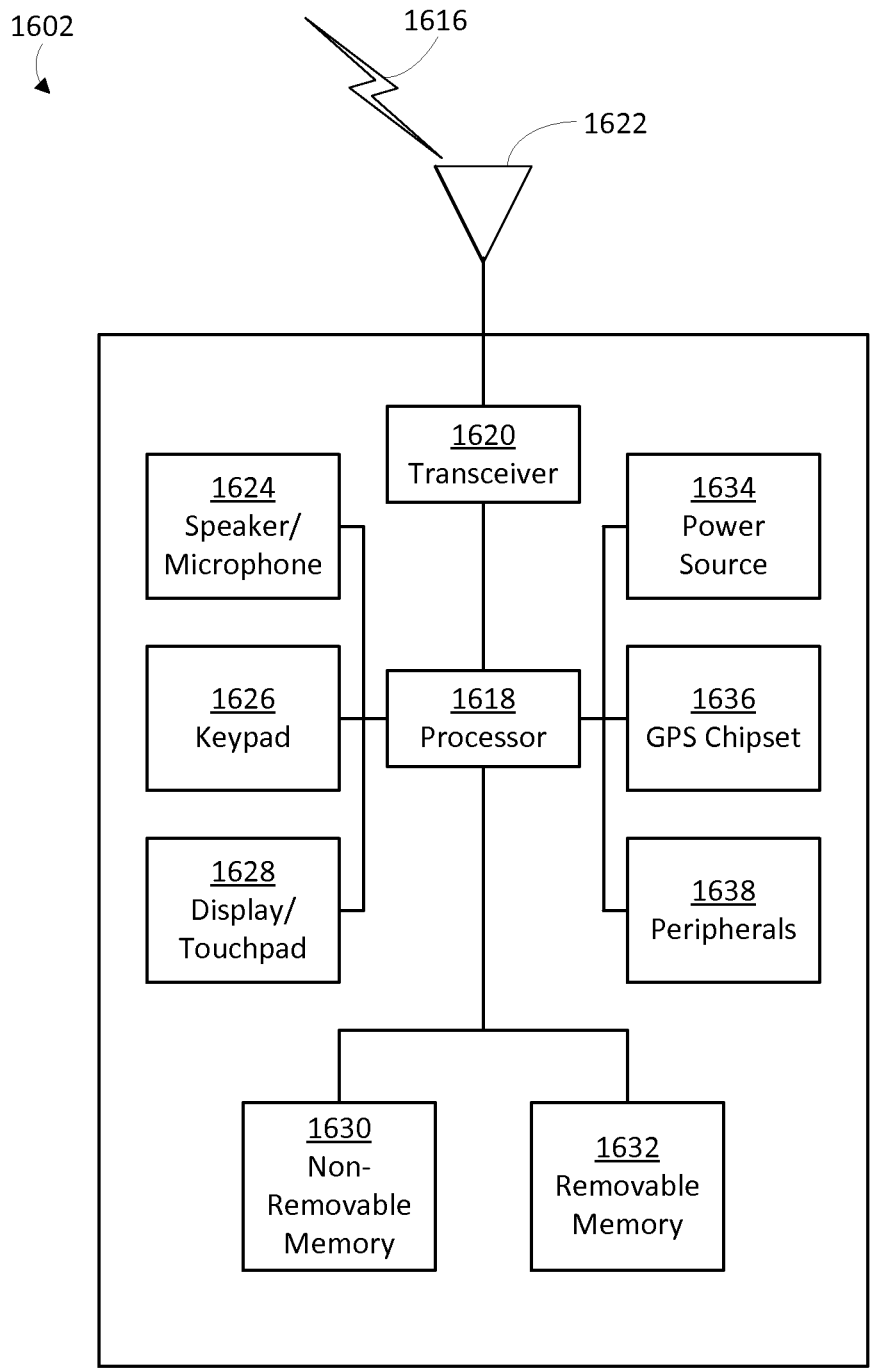
FIG. 16B depicts a system diagram of an example wireless transmit/receive unit (WTRU) that may be used within the communications system illustrated in FIG. 16A.

FIG. 16B is a system diagram of an example WTRU 1602. As shown in FIG. 16B, the WTRU 1602 may include a processor 1618, a transceiver 1620, a transmit/receive element 1622, a speaker/microphone 1624, a keypad 1626, a display/touchpad 1628, non-removable memory 1630, removable memory 1632, a power source 1634, a global positioning system (GPS) chipset 1636, and other peripherals 1638. It should be appreciated that the WTRU 1602 may include any sub-combination of the foregoing elements while remaining consistent with an embodiment.

The processor 1618 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the WTRU 1602 to operate in a wireless environment. The processor 1618 may be coupled to the transceiver 1620, which may be coupled to the transmit/receive element 1622. While FIG. 16B depicts the processor 1618 and the transceiver 1620 as separate components, it should be appreciated that the processor 1618 and the transceiver 1620 may be integrated together in an electronic package or chip.

The transmit/receive element 1622 may be configured to transmit signals to, or receive signals from, a base station (e.g., the base station 1614*a*) over the air interface 1616. For example, in one embodiment, the transmit/receive element 1622 may be an antenna configured to transmit and/or receive RF signals. In another embodiment, the transmit/receive element 1622 may be an emitter/detector configured to transmit and/or receive IR, UV, or visible light signals, for example. In yet another embodiment, the transmit/receive element 1622 may be configured to transmit and receive both RF and light signals. It should be appreciated that the transmit/receive element 1622 may be configured to transmit and/or receive any combination of wireless signals.

In addition, although the transmit/receive element 1622 is depicted in FIG. 16B as a single element, the WTRU 1602 may include any number of transmit/receive elements 1622. More specifically, the WTRU 1602 may employ MIMO technology. Thus, in one embodiment, the WTRU 1602 may include two or more transmit/receive elements 1622 (e.g., multiple antennas) for transmitting and receiving wireless signals over the air interface 1616.

The transceiver 1620 may be configured to modulate the signals that are to be transmitted by the transmit/receive element 1622 and to demodulate the signals that are received by the transmit/receive element 1622. As noted above, the WTRU 1602 may have multi-mode capabilities. Thus, the transceiver 1620 may include multiple transceivers for enabling the WTRU 1602 to communicate via multiple RATs, such as UTRA and IEEE 802.11, for example.

The processor 1618 of the WTRU 1602 may be coupled to, and may receive user input data from, the speaker/microphone 1624, the keypad 1626, and/or the display/touchpad 1628 (e.g., a liquid crystal display (LCD) display unit or organic light-emitting diode (OLED) display unit). The processor 1618 may also output user data to the speaker/microphone 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the WTRU 1602, such as on a server or a home computer (not shown).

The processor 1618 may receive power from the power source 1634, and may be configured to distribute and/or control the power to the other components in the WTRU 1602. The power source 1634 may be any suitable device for powering the WTRU 1602. For example, the power source 1634 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1618 may also be coupled to the GPS chipset 1636, which may be configured to provide location information (e.g., longitude and latitude) regarding the current location of the WTRU 1602. In addition to, or in lieu of, the information from the GPS chipset 1636, the WTRU 1602 may receive location information over the air interface 1616 from a base station (e.g., base stations 1614*a*, 1614*b*) and/or determine its location based on the timing of the signals being received from two or more nearby base stations. It should be appreciated that the WTRU 1602 may acquire location information by way of any suitable location-determination method while remaining consistent with an embodiment.

The processor 1618 may further be coupled to other peripherals 1638, which may include one or more software and/or hardware modules that provide additional features, functionality and/or wired or wireless connectivity. For example, the peripherals 1638 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 16C:
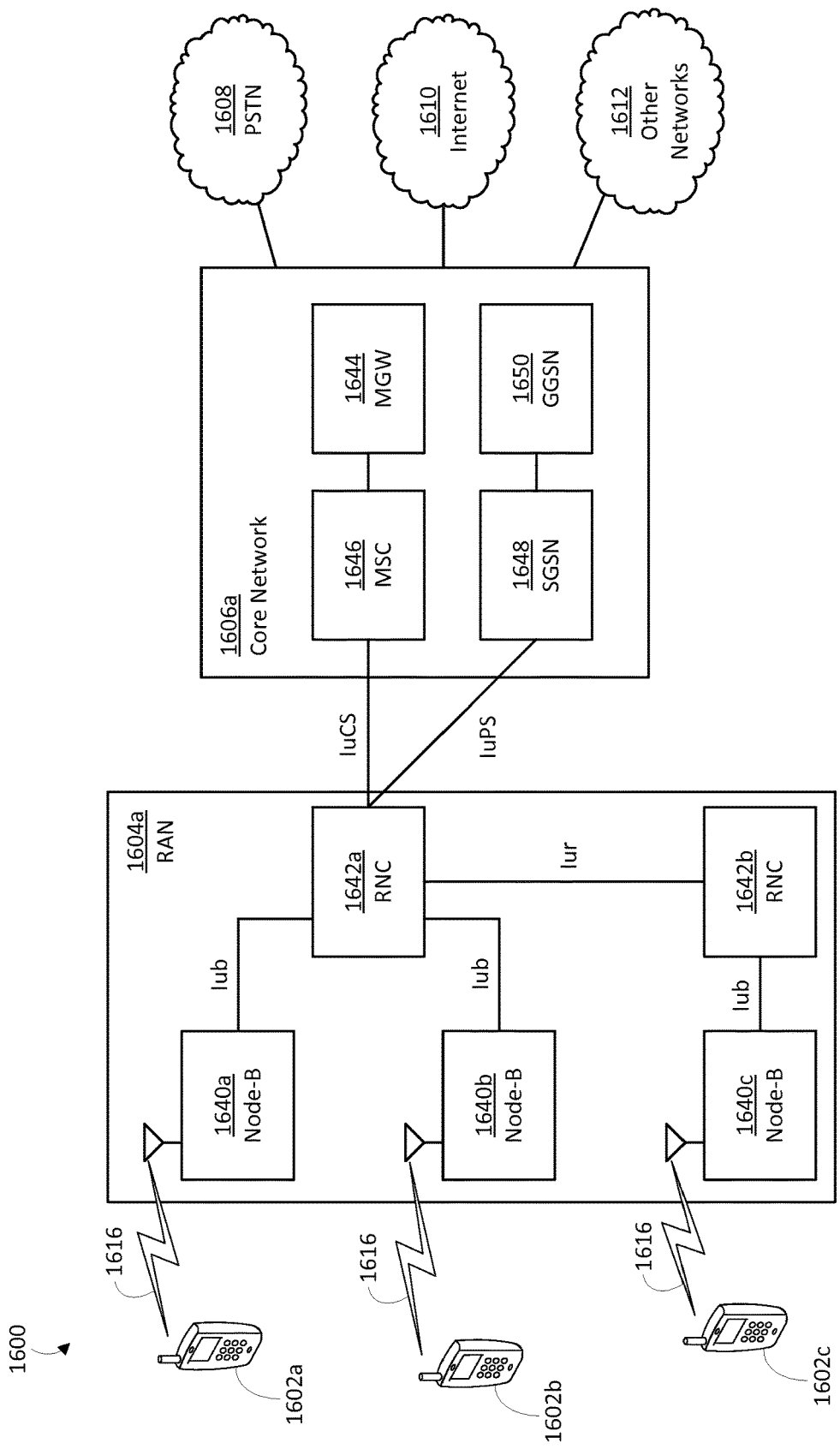
FIG. 16C depicts a system diagram of an example radio access network and an example core network that may be used within the communications system illustrated in FIG. 16A.

FIG. 16C is a system diagram of an embodiment of the communications system 1600 that includes a RAN 1604a and a core network 1606a that comprise example implementations of the RAN 1604 and the core network 1606, respectively. As noted above, the RAN 1604, for instance the RAN 1604a, may employ a UTRA radio technology to communicate with the WTRUs 1602a, 1602b, and 1602c over the air interface 1616. The RAN 1604a may also be in communication with the core network 1606a. As shown in FIG. 16C, the RAN 1604a may include Node-Bs 1640a, 1640b, 1640c, which may each include one or more transceivers for communicating with the WTRUs 1602a, 1602b, 1602c over the air interface 1616. The Node-Bs 1640a, 1640b, 1640c may each be associated with a particular cell (not shown) within the RAN 1604a. The RAN 1604a may also include RNCs 1642a, 1642b. It should be appreciated that the RAN 1604a may include any number of Node-Bs and RNCs while remaining consistent with an embodiment.

As shown in FIG. 16C, the Node-Bs 1640a, 1640b may be in communication with the RNC 1642a. Additionally, the Node-B 1640c may be in communication with the RNC 1642b. The Node-Bs 1640a, 1640b, 1640c may communicate with the respective RNCs 1642a, 1642b via an Iub interface. The RNCs 1642a, 1642b may be in communication with one another via an Iur interface. Each of the RNCs 1642a, 1642b may be configured to control the respective Node-Bs 1640a, 1640b, 1640c to which it is connected. In addition, each of the RNCs 1642a, 1642b may be configured to carry out or support other functionality, such as outer loop power control, load control, admission control, packet scheduling, handover control, macrodiversity, security functions, data encryption, and the like.

The core network 1606a shown in FIG. 16C may include a media gateway (MGW) 1644, a mobile switching center (MSC) 1646, a serving GPRS support node (SGSN) 1648, and/or a gateway GPRS support node (GGSN) 1650. While each of the foregoing elements is depicted as part of the core network 1606a, it should be appreciated that any one of these elements may be owned and/or operated by an entity other than the core network operator.

The RNC 1642a in the RAN 1604a may be connected to the MSC 1646 in the core network 1606a via an IuCS interface. The MSC 1646 may be connected to the MGW 1644. The MSC 1646 and the MGW 1644 may provide the WTRUs 1602a, 1602b, 1602c with access to circuit-switched networks, such as the PSTN 1608, to facilitate communications between the WTRUs 1602a. 1602b, 1602c and traditional land-line communications devices.

The RNC 1642a in the RAN 1604a may also be connected to the SGSN 1648 in the core network 1606a via an IuPS interface. The SGSN 1648 may be connected to the GGSN 1650. The SGSN 1648 and the GGSN 1650 may provide the WTRUs 1602a, 1602b, 1602c with access to packet-switched networks, such as the Internet 1610, to facilitate communications between and the WTRUs 1602a, 1602b, 1602c and IP-enabled devices.

As noted above, the core network 1606a may also be connected to the networks 1612, which may include other wired or wireless networks that are owned and/or operated by other service providers.

Figure 16D:
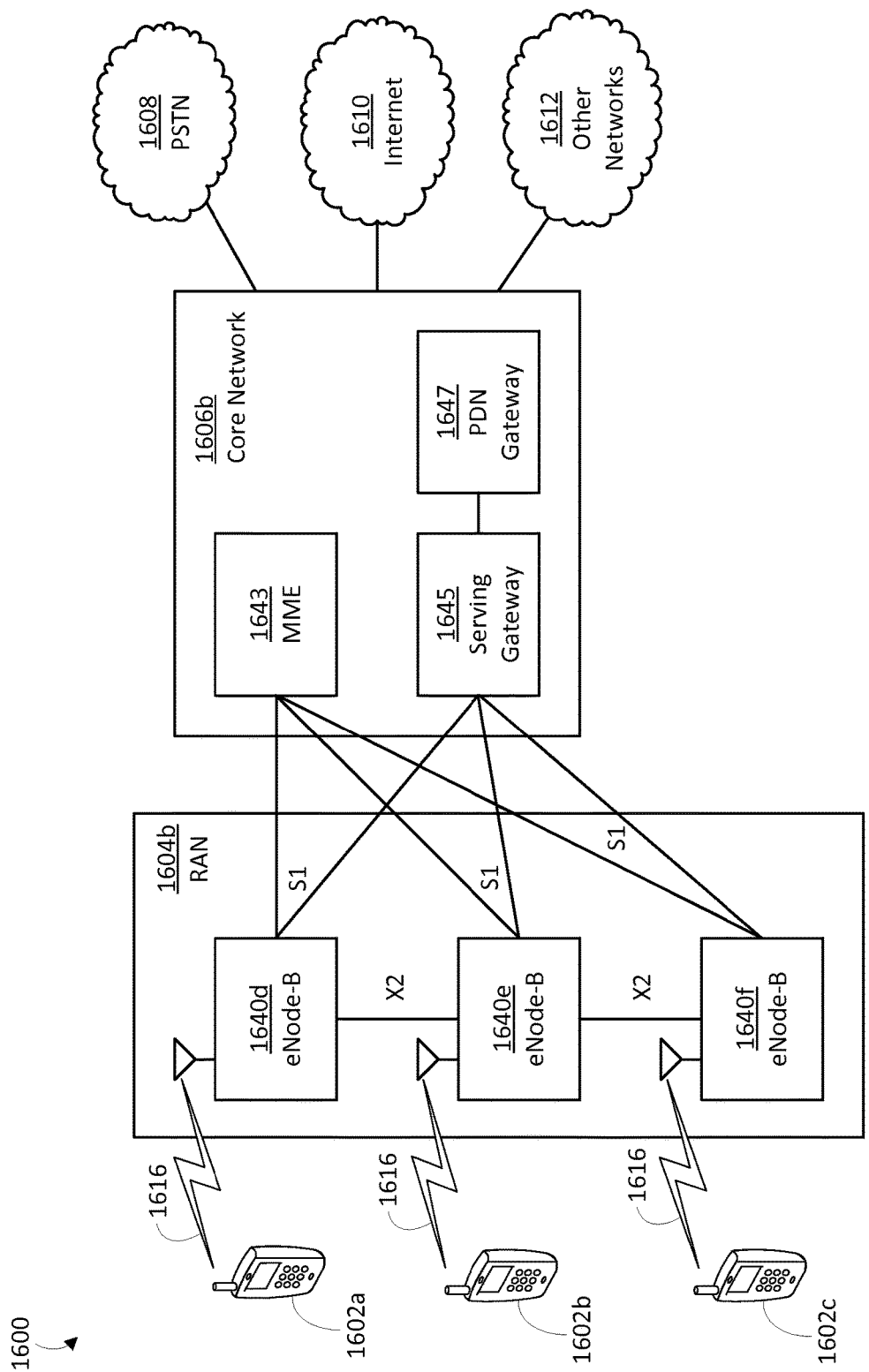
FIG. 16D depicts a system diagram of an example radio access network and an example core network that may be used within the communications system illustrated in FIG. 16A.

FIG. 16D is a system diagram of an embodiment of the communications system 1600 that includes a RAN 1604b and a core network 1606b that comprise example implementations of the RAN 1604 and the core network 1606, respectively. As noted above, the RAN 1604, for instance the RAN 1604b, may employ an E-UTRA radio technology to communicate with the WTRUs 1602a, 1602b, and 1602c over the air interface 1616. The RAN 1604b may also be in communication with the core network 1606b.

The RAN 1604b may include eNode-Bs 1640d, 1640e, 1640f, though it should be appreciated that the RAN 1604b may include any number of eNode-Bs while remaining consistent with an embodiment. The eNode-Bs 1640d. 1640e, 1640f may each include one or more transceivers for communicating with the WTRUs 1602a, 1602b, 1602c over the air interface 1616. In one embodiment, the eNode-Bs 1640d, 1640e, 1640f may implement MIMO technology. Thus, the eNode-B 1640d, for example, may use multiple antennas to transmit wireless signals to, and receive wireless signals from, the WTRU 1602a.

Each of the eNode-Bs 1640d, 1640e, and 1640f may be associated with a particular cell (not shown) and may be configured to handle radio resource management decisions, handover decisions, scheduling of users in the uplink and/or downlink, and the like. As shown in FIG. 16D, the eNode-Bs 1640d, 1640e, 1640f may communicate with one another over an X2 interface.

The core network 1606b shown in FIG. 16D may include a mobility management gateway (MME) 1643, a serving gateway 1645, and a packet data network (PDN) gateway 1647. While each of the foregoing elements is depicted as part of the core network 1606b, it should be appreciated that any one of these elements may be owned and/or operated by an entity other than the core network operator.

The MME 1643 may be connected to each of the eNode-Bs 1640d, 1640e, and 1640f in the RAN 1604b via an S1 interface and may serve as a control node. For example, the MME 1643 may be responsible for authenticating users of the WTRUs 1602a, 1602b, 1602c, bearer activation/deactivation, selecting a particular serving gateway during an initial attach of the WTRUs 1602a, 1602b, 1602c, and the like. The MME 1643 may also provide a control plane function for switching between the RAN 1604b and other RANs (not shown) that employ other radio technologies, such as GSM or WCDMA.

The serving gateway 1645 may be connected to each of the eNode Bs 1640d, 1640e, 1640f in the RAN 1604b via the S1 interface. The serving gateway 1645 may generally route and forward user data packets to/from the WTRUs 1602a, 1602b, 1602c. The serving gateway 1645 may also perform other functions, such as anchoring user planes during inter-eNode B handovers, triggering paging when downlink data is available for the WTRUs 1602a, 1602b, 1602c, managing and storing contexts of the WTRUs 1602a, 1602b. 1602c, and the like.

The serving gateway 1645 may also be connected to the PDN gateway 1647, which may provide the WTRUs 1602a, 1602b, 1602c with access to packet-switched networks, such as the Internet 1610, to facilitate communications between the WTRUs 1602a, 1602b, 1602c and IP-enabled devices.

The core network 1606b may facilitate communications with other networks. For example, the core network 1606b may provide the WTRUs 1602a, 1602b, 1602c with access to circuit-switched networks, such as the PSTN 1608, to facilitate communications between the WTRUs 1602a, 1602b, 1602c and traditional land-line communications devices. For example, the core network 1606b may include, or may communicate with, an IP gateway (e.g., an IP multimedia subsystem (IMS) server) that serves as an interface between the core network 1606b and the PSTN 1608. In addition, the core network 1606b may provide the WTRUs 1602a. 1602b. 1602c with access to the networks 1612, which may include other wired or wireless networks that are owned and/or operated by other service providers.

Figure 16E:
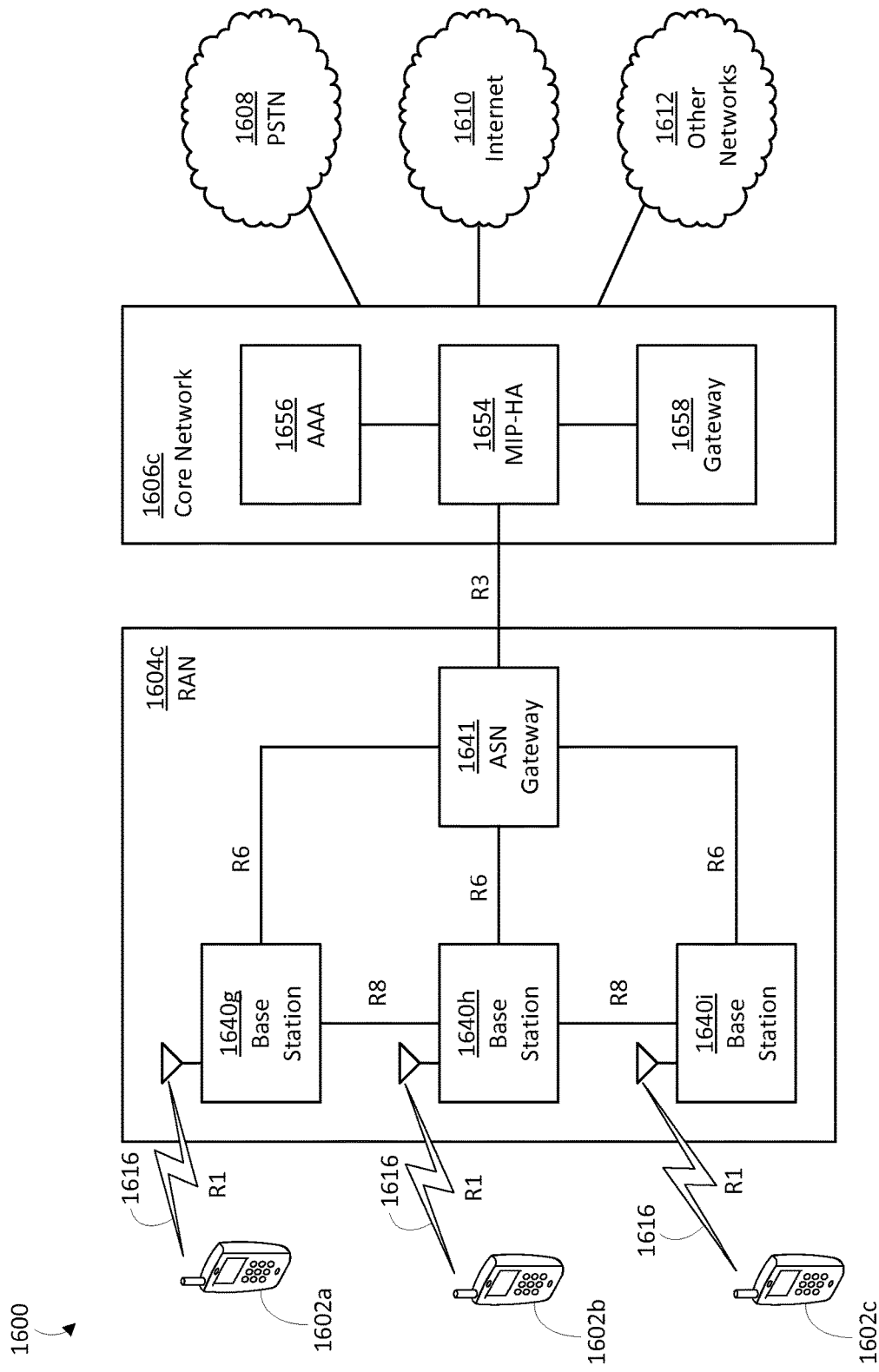
FIG. 16E depicts a system diagram of an example radio access network and an example core network that may be used within the communications system illustrated in FIG. 16A.

FIG. 16E is a system diagram of an embodiment of the communications system 1600 that includes a RAN 1604c and a core network 1606c that comprise example implementations of the RAN 1604 and the core network 1606, respectively. The RAN 1604, for instance the RAN 1604c, may be an access service network (ASN) that employs IEEE 802.16 radio technology to communicate with the WTRUs 1602a, 1602b, and 1602c over the air interface 1616. As described herein, the communication links between the different functional entities of the WTRUs 1602a. 1602b, 1602c, the RAN 1604c, and the core network 1606c may be defined as reference points.

As shown in FIG. 16E, the RAN 1604c may include base stations 1640g. 1640h, 1640i, and an ASN gateway 1641, though it should be appreciated that the RAN 1604c may include any number of base stations and ASN gateways while remaining consistent with an embodiment. The base stations 1640g, 1640h, 1640i may each be associated with a particular cell (not shown) in the RAN 1604c and may each include one or more transceivers for communicating with the WTRUs 1602a, 1602b, 1602c over the air interface 1616. In one embodiment, the base stations 1640g, 1640h, 1640i may implement MIMO technology. Thus, the base station 1640g, for example, may use multiple antennas to transmit wireless signals to, and receive wireless signals from, the WTRU 1602a. The base stations 1640g, 1640h, 1640i may also provide mobility management functions, such as handoff triggering, tunnel establishment, radio resource management, traffic classification, quality of service (QoS) policy enforcement, and the like. The ASN Gateway 1641 may serve as a traffic aggregation point and may be responsible for paging, caching of subscriber profiles, routing to the core network 1606c, and the like.

The air interface 1616 between the WTRUs 1602a, 1602b, 1602c and the RAN 1604c may be defined as an R1 reference point that implements the IEEE 802.16 specification. In addition, each of the WTRUs 1602a, 1602b, and 1602c may establish a logical interface (not shown) with the core network 1606c. The logical interface between the WTRUs 1602a, 1602b, 1602c and the core network 1606c may be defined as an R2 reference point, which may be used for authentication, authorization, IP host configuration management, and/or mobility management.

The communication link between each of the base stations 1640g, 1640h, 1640i may be defined as an R8 reference point that includes protocols for facilitating WTRU handovers and the transfer of data between base stations. The communication link between the base stations 1640g, 1640h, 1640i and the ASN gateway 1641 may be defined as an R6 reference point. The R6 reference point may include protocols for facilitating mobility management based on mobility events associated with each of the WTRUs 1602a, 1602b, 1602c.

As shown in FIG. 16E, the RAN 1604c may be connected to the core network 1606c. The communication link between the RAN 1604c and the core network 1606c may defined as an R3 reference point that includes protocols for facilitating data transfer and mobility management capabilities, for example. The core network 1606c may include a mobile IP home agent (MIP-HA) 1644, an authentication, authorization, accounting (AAA) server 1656, and a gateway 1658. While each of the foregoing elements is depicted as part of the core network 1606c, it should be appreciated that any one of these elements may be owned and/or operated by an entity other than the core network operator.

The MIP-HA may be responsible for IP address management, and may enable the WTRUs 1602a, 1602b, and 1602c to roam between different ASNs and/or different core networks. The MIP-HA 1654 may provide the WTRUs 1602a, 1602b, 1602c with access to packet-switched networks, such as the Internet 1610, to facilitate communications between the WTRUs 1602a, 1602b, 1602c and IP-enabled devices. The AAA server 1656 may be responsible for user authentication and for supporting user services. The gateway 1658 may facilitate interworking with other networks. For example, the gateway 1658 may provide the WTRUs 1602a, 1602b, 1602c with access to circuit-switched networks, such as the PSTN 1608, to facilitate communications between the WTRUs 1602a, 1602b, 1602c and traditional landline communications devices. In addition, the gateway 1658 may provide the WTRUs 1602a, 1602b, 1602c with access to the networks 1612, which may include other wired or wireless networks that are owned and/or operated by other service providers.

Although not shown in FIG. 16E, it should be appreciated that the RAN 1604c may be connected to other ASNs and the core network 1606c may be connected to other core networks. The communication link between the RAN 1604c the other ASNs may be defined as an R4 reference point, which may include protocols for coordinating the mobility of the WTRUs 1602a, 1602b, 1602c between the RAN 1604c and the other ASNs. The communication link between the core network 1606c and the other core networks may be defined as an R5 reference point, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments. It should be appreciated that the herein described enhanced deblocking filters and enhanced boundary strength calculation processes are not limited to use with the example scalable video coding system of FIGS. 2 and 3, and that they may be implemented in any other video coding system, such as a single layer video coding system or video coding device.

What is claimed:

1. A method of video coding, the method comprising:
identifying a first video block of a video bitstream;
identifying a second video block of the video bitstream that shares a boundary with the first video block;
determining whether at least one of the first video block or the second video block is predicted using inter layer prediction;
determining a boundary strength value for the boundary shared between the first video block and the second video block based at least on:
whether at least one of the first video block or the second video block is predicted using inter layer prediction, and
a partition size of the first video block, wherein, on a condition that the partition size of the first video block is large, the boundary strength value is determined to be a value that is associated with a strong deblocking filter; and
applying a deblocking filter based on the boundary strength value to the boundary shared between the first video block and the second video block.

2. The method of claim 1, wherein the first video block and the second video block are associated with a current picture and wherein determining whether at least one of the first video block or the second video block is predicted using inter layer prediction comprises:
determining whether a picture order count (POC) associated with the current picture and a POC associated with at least one reference picture used to predict the first video block or the second video block are the same; and
on a condition that the POC associated with the current picture and the POC associated with at least one reference picture used to predict the first video block or the second video block are the same, determining that at least one of the first video block or the second video block is predicted using inter layer prediction.

3. The method of claim 1, wherein on a condition that at least one of the first video block or the second video block is predicted using inter layer prediction, the boundary strength value is determined to be a value that is associated with a strong deblocking filter.

4. The method of claim 1, further comprising increasing the boundary strength value on a condition that at least one of the first video block or the second video block is predicted using inter layer prediction.

5. The method of claim 1, further comprising determining whether to consider inter layer prediction when applying the deblocking filter based on an inter layer prediction enablement indication in the video bitstream.

6. The method of claim 1, further comprising determining whether at least one of the first video block or the second video block is associated with a base layer block that is coded using intra mode, and wherein determining the boundary strength value is further based on determining whether at least one of the first video block or the second video block corresponds to a base layer block that is coded using intra mode.

7. A device for video coding comprising:
a processor configured at least to:
receive a first video bock of a video bitstream;
receive a second video block of the video bitstream that shares a boundary with the first video block;
determine whether at least one of the first video block or the second video block is predicted using inter layer prediction;
determine a boundary strength value for the boundary shared between the first video block and the second video block based at least on:
whether at least one of the first video block or the second video block is predicted using inter layer prediction, and
a partition size of the first video block, wherein on a condition that the partition size of the first video block is large, the boundary strength value is determined to be a value that is associated with a strong deblocking filter; and
apply a deblocking filter based on the boundary strength value to the boundary shared between the first video block and the second video block.

8. The device of claim 7, wherein the first video block and the second video block are associated with a current picture and wherein determining whether at least one of the first video block or the second video block is predicted using inter layer prediction comprises:
determining whether a picture order count (POC) associated with the current picture and a POC associated with at least one reference picture used to predict the first video block or the second video block are the same; and
on a condition that the POC associated with the current picture and the POC associated with at least one reference picture used to predict the first video block or the second video block are the same, determining that at least one of the first video block or the second video block is predicted using inter layer prediction.

9. The device of claim 7, wherein on a condition that at least one of the first video block or the second video block is predicted using inter layer prediction, the boundary strength value is determined to be a value that is associated with a strong deblocking filter.

10. The device of claim 7, wherein the processor is further configured to increase the boundary strength value on a condition that at least one of the first video block or the second video block is predicted using inter layer prediction.

11. The device of claim 7, wherein the processor is further configured to determine whether to consider inter layer prediction when adapting the deblocking filter based on an inter layer prediction enablement indication in the video bitstream.

12. The device of claim 7, wherein the processor is further configured to determine whether at least one of the first video block or the second video block is associated with a base layer block that is coded using intra mode, and wherein the determination of the boundary strength value is further based on the determination of whether at least one of the first video block or the second video block corresponds to a base layer block that is coded using intra mode.

13. A method of video coding, the method comprising:
identifying a first video block of a video bitstream;
identifying a second video block of the video bitstream that shares a boundary with the first video block;
determining whether at least one of the first video block or the second video block is predicted using inter layer prediction;

determining whether at least one of the first video block or the second video block is associated with a base layer block that is coded using intra mode;

determining a boundary strength value for the boundary shared between the first video block and the second video block based at least on:
- whether at least one of the first video block or the second video block is predicted using inter layer prediction, and
- whether at least one of the first video block or the second video block corresponds to a base layer block that is coded using intra mode; and applying a deblocking filter based on the boundary strength value to the boundary shared between the first video block and the second video block.

14. The method of claim 13, wherein the first video block and the second video block are associated with a current picture and wherein determining whether at least one of the first video block or the second video block is predicted using inter layer prediction comprises:

determining whether a picture order count (POC) associated with the current picture and a POC associated with at least one reference picture used to predict the first video block or the second video block are the same; and on a condition that the POC associated with the current picture and the POC associated with at least one reference picture used to predict the first video block or the second video block are the same, determining that at least one of the first video block or the second video block is predicted using inter layer prediction.

15. The method of claim 13, wherein on a condition that at least one of the first video block or the second video block is predicted using inter layer prediction, the boundary strength value is determined to be a value that is associated with a strong deblocking filter.

16. The method of claim 13, further comprising determining whether to consider inter layer prediction when applying the deblocking filter based on an inter layer prediction enablement indication in the video bitstream.

17. A device for video coding comprising:
a processor configured at least to:
receive a first video bock of a video bitstream;
receive a second video block of the video bitstream that shares a boundary with the first video block;

determine whether at least one of the first video block or the second video block is predicted using inter layer prediction;

determine whether at least one of the first video block or the second video block is associated with a base layer block that is coded using intra mode;

determine a boundary strength value for the boundary shared between the first video block and the second video block based at least on:
- whether at least one of the first video block or the second video block is predicted using inter layer prediction, and
- whether at least one of the first video block or the second video block corresponds to a base layer block that is coded using intra mode; and apply a deblocking filter based on the boundary strength value to the boundary shared between the first video block and the second video block.

18. The device of claim 17, wherein the first video block and the second video block are associated with a current picture and wherein determining whether at least one of the first video block or the second video block is predicted using inter layer prediction comprises:

determining whether a picture order count (POC) associated with the current picture and a POC associated with at least one reference picture used to predict the first video block or the second video block are the same; and on a condition that the POC associated with the current picture and the POC associated with at least one reference picture used to predict the first video block or the second video block are the same, determining that at least one of the first video block or the second video block is predicted using inter layer prediction.

19. The device of claim 17, wherein on a condition that at least one of the first video block or the second video block is predicted using inter layer prediction, the boundary strength value is determined to be a value that is associated with a strong deblocking filter.

20. The device of claim 17, wherein the processor is further configured to determine whether to consider inter layer prediction when adapting the deblocking filter based on an inter layer prediction enablement indication in the video bitstream.

* * * * *